(12) United States Patent
Sullivan

(10) Patent No.: US 9,020,469 B2
(45) Date of Patent: Apr. 28, 2015

(54) NETWORK AUDIO DISTRIBUTION SYSTEM AND METHOD

(71) Applicant: Terence Sean Sullivan, Somerville, MA (US)

(72) Inventor: Terence Sean Sullivan, Somerville, MA (US)

(73) Assignee: RangeCast Technologies, LLC, Ely, NV (US)

( * ) Notice: Subject to any disclaimer, the term of this patent is extended or adjusted under 35 U.S.C. 154(b) by 27 days.

(21) Appl. No.: 13/941,023

(22) Filed: Jul. 12, 2013

(65) Prior Publication Data

US 2014/0357234 A1 Dec. 4, 2014

Related U.S. Application Data

(60) Provisional application No. 61/830,849, filed on Jun. 4, 2013.

(51) Int. Cl.
*H04W 84/08* (2009.01)
*H04W 4/06* (2009.01)

(52) U.S. Cl.
CPC ...................................... *H04W 4/06* (2013.01)

(58) Field of Classification Search
USPC ............... 455/556.1, 411, 412.1, 3.06, 166.1; 700/94; 709/219, 231
See application file for complete search history.

(56) References Cited

U.S. PATENT DOCUMENTS

| | | |
|---|---|---|
| 5,479,474 A | 12/1995 | Schwartzmann et al. |
| 5,608,662 A | 3/1997 | Large et al. |
| 6,014,687 A | 1/2000 | Watanabe et al. |
| 6,222,841 B1 | 4/2001 | Taniguchi |
| 6,289,207 B1 | 9/2001 | Hudecek et al. |
| 6,381,314 B1 | 4/2002 | Walinski |
| 6,389,463 B2 | 5/2002 | Bolas et al. |
| 6,442,598 B1 | 8/2002 | Wright et al. |
| 6,463,470 B1 | 10/2002 | Mohaban et al. |
| 6,496,687 B1 | 12/2002 | Switlyk |
| 6,581,103 B1 | 6/2003 | Dengler |
| 6,584,439 B1 | 6/2003 | Geilhufe et al. |
| 6,625,135 B1 | 9/2003 | Johnson et al. |
| 6,647,389 B1 | 11/2003 | Fitch et al. |
| 6,684,249 B1 | 1/2004 | Frerichs et al. |
| 6,711,622 B1 | 3/2004 | Fuller et al. |
| 6,769,028 B1 | 7/2004 | Sass et al. |
| 6,804,510 B1 | 10/2004 | Bates et al. |
| 6,934,277 B1 | 8/2005 | Werve et al. |
| 6,957,264 B1 | 10/2005 | Jacobs |
| 7,002,992 B1 | 2/2006 | Shaffer et al. |
| 7,093,028 B1 | 8/2006 | Shao et al. |
| 7,162,418 B2 | 1/2007 | Leichtling et al. |
| 7,162,533 B2 | 1/2007 | Klements |
| 7,489,946 B2 | 2/2009 | Srinivasan et al. |
| 7,761,901 B2 * | 7/2010 | Walker et al. ................... 725/95 |
| 7,836,183 B1 | 11/2010 | Barnett et al. |
| 8,125,988 B1 * | 2/2012 | Sullivan et al. ............... 370/389 |
| 8,429,287 B2 * | 4/2013 | Sullivan ........................ 709/231 |
| 2001/0027399 A1 | 10/2001 | Yasushi et al. |
| 2001/0039187 A1 | 11/2001 | Shively |

(Continued)

*Primary Examiner* — Diane Mizrahi
(74) *Attorney, Agent, or Firm* — Dan Brown Law Office; Daniel R. Brown

(57) ABSTRACT

A network based system for distributing audio recordings of discrete transmissions from land mobile radio systems received by plural radio terminals having scanning receivers to plural client terminals, including methods of selecting the best available recordings and selectively storing content both locally in the radio terminals and at network based storage locations.

21 Claims, 13 Drawing Sheets

(56) References Cited

U.S. PATENT DOCUMENTS

| | | |
|---|---|---|
| 2001/0051958 A1 | 12/2001 | deVries et al. |
| 2002/0091790 A1 | 7/2002 | Cubley |
| 2002/0193989 A1 | 12/2002 | Geilhufe et al. |
| 2003/0093281 A1 | 5/2003 | Geilhufe et al. |
| 2003/0093485 A1 | 5/2003 | Dougall et al. |
| 2004/0002970 A1 | 1/2004 | Hur |
| 2004/0019781 A1 | 1/2004 | Chari et al. |
| 2004/0098341 A1 | 5/2004 | Urich et al. |
| 2004/0107242 A1 | 6/2004 | Vert et al. |
| 2005/0010961 A1 | 1/2005 | Hagen et al. |
| 2005/0232282 A1 | 10/2005 | Silver et al. |
| 2006/0126494 A1 | 6/2006 | Dougall et al. |
| 2006/0287746 A1 | 12/2006 | Braithwaite et al. |
| 2006/0288395 A1 | 12/2006 | DiLorenzo |
| 2007/0021057 A1 | 1/2007 | Arseneau et al. |
| 2007/0218894 A1 | 9/2007 | Harris et al. |
| 2007/0286169 A1 | 12/2007 | Roman |
| 2008/0117899 A1 | 5/2008 | Sullivan et al. |
| 2011/0176427 A1* | 7/2011 | Huang et al. ............ 370/241 |
| 2014/0329457 A1* | 11/2014 | Sullivan ................ 455/3.06 |
| 2014/0364075 A1* | 12/2014 | Sullivan ................ 455/166.1 |

* cited by examiner

Radio Terminal / Scanner

Client Terminal

Large Enterprise User

Scanner Volative to Static Transition and Static Preferred Storage

Best Criteria
Duration (long is good)
Signal Strength
Admin Rating
Reliability Rating
SOT/EOT
Scanner Rating

NETWORK AUDIO DISTRIBUTION SYSTEM AND METHOD

BACKGROUND OF THE INVENTION

1. Field of the Invention

The present invention relates to land mobile radio scanners and network delivery of audio received thereby. More particularly, the present invention is directed radio scanners that are interconnected by the Internet, and which announce availability of captured audio so that client terminals may request audio content through the Internet.

2. Description of the Related Art

Scanning radio receivers, commonly known as "police scanners" or simply "scanners", allow users to listen to police, fire, aircraft, marine, business and other manner of one-way and two-way radio communications across a broad spectrum of frequencies, typically from 25 MHz to 1300 MHz, and including higher frequencies as well. This spectrum, broadcasting, and receiving system, is generally referred to as Land Mobile Radio (LMR). Land mobile radio systems, also called public land mobile radio or private land mobile radio, is a term that denotes a wireless communications system intended for use by terrestrial users in vehicles (mobiles) or on foot (portables). Such systems are used by emergency first responder organizations, public works organizations, or companies with large vehicle fleets or numerous field staff. Scanners typically have a channel memory that is used to store one or more receiver frequencies, or indicia of frequency, which can be recalled by referencing a channel number, thereby simplifying the entry and selection of desired reception frequencies. Various types of scanners are known, some operating in a few bands of frequencies with limited channel memory capacity, others being full-featured models that cover all the pertinent bands and including generous channel memory capacity. Scanners are enabled to sequentially change reception frequencies, thereby scanning through a list of frequencies, searching for broadcasts that may or may not be of interest to a user. In modern scanners the selection of a radio frequency generally includes specifying the radio frequency band and the receiver phase-locked loop (PLL) divisor that is requires to tune the receiver to discriminate the precise frequency of interest. Thus, the specification of the RF-band and PLL divisor with a digital selection means enables a precise reception frequency in most scanners.

Modern radio broadcast systems employ digital processor to control the allocation of frequencies for radio communications. This typically also include spectrum utilization efficiency improving techniques that enable systems to offer a greater number of communications "channels" than the number of actual radio frequencies that may exist in a system. Thus, a single frequency may be utilized for a large number of channels, which are managed by a system protocol. The system protocols use various techniques for defining and allocating channels, and modern scanners have corresponding decoding systems or distinguishing channels from one another, as is appreciated by those skilled in the art.

Scanner radio receivers typically employ some form of squelch control so that noise and undesirable communications are not routed through to a loudspeaker or other audio circuit. Carrier squelch can be used, which gates received audio to a loudspeaker based on the signal-to-noise ratio or carrier-to-noise ratio of the receiver demodulator output. Other systems employ out of band tones that are detected to control squelch. This is an example of a technique to provide more than one channel of communications on a single frequency. Certain receivers are sensitive to certain tones, and therefore receive and transmit communications only on channels where the tones match. One such system employs plural sub-audible tones, and is referred to as a continuously tone coded squelch system ("CTCSS"), as is well known in the art. The receiver checks for a particular one of the plural tones based on the channel programming, and detection of a matching tone enables the squelch gate of the receiver. Another system employs digital data fields that are broadcast along with the primary communication signals, and the receiver looks for a matching digital code. Such systems are referred to as digitally coded squelch systems ("DCS"). Other squelch control systems are known as well.

Early two-way radio systems employed a single radio frequency or a duplex pair of radio frequencies for two-way communications. Such systems lent themselves well to scanning receiver monitoring because a given two-way radio fleet of users, such as the local police department, could be readily monitored by receiving a single, predetermined, radio frequency. However, heavy radio use demand and congested airways caused manufacturers to develop more spectrally efficient radio systems. One solution was the trunked radio system where a group of two to twenty-eight duplex pairs of radio frequencies are allocated together for shared use by plural fleets of users. In a trunked system, talk group identities are assigned to the fleets, which are used to provide receiver squelch gate control for the plural members of any given fleet of users. The difference in a trunked radio system vis-à-vis a conventional system is that the radio frequencies are dynamically allocated during use. For each push-to-talk of a transmitter, the system dynamically allocates a radio frequency for the transmitter to use. As such, a conversation between a dispatcher and a fleet of patrol cars, for example, can change from frequency to frequency within the trunked group of frequencies during the course of a conversation. Thus, the conversation is carried out over an intermittent sequence of discrete radio transmission of audio content. Suppliers of scanning receivers addressed this difference in functionality by developing radios that could track the talk group identities ("talk group ID's") and dynamically hop from frequency to frequency as the conversation progressed. The key to radio scanner operation in a trunking environment is to have all of the trunking frequencies for each trunk group stored in the scanner channel memory, typically associated with a system identity ("System ID"), and then track the talk group ID code of the desired fleet, along with the dynamic allocation of the trunking frequencies. In this way, the trunked scanner functions like a conventional scanner from the user's perspective, with the "channel" actually associated with both a trunking system ID and a talk group ID instead of the conventional radio system frequency-to-channel, plus squelch code, correlation. Certain trunking systems dedicate one of their allocated frequencies as a control channel carrying relatively high speed data signals, which are monitored by receivers looking for assignment to a talk channel from time to time.

Two-way mobile radio communications systems are widely used for a variety of applications including public safety, commercial, and personal communications. Radios with transmitter and receiver elements, commonly known as transceivers participate in these communications. In addition, other radio receivers, such as scanners, monitor communications without participating through transmissions.

Most two-way radio communications operate according to a transmission trunked control systems. This is different from the conversation trunked system. For example, a PSTN telephone call is conversation trunked in that the communications resource is set-up and maintained for the entire duration of a conversation, even during periods of quiet between the parties to the conversation. In a transmission trunked environment, the system operates in a push-to-talk mode. In this situation, each verbal statement from each user is individually transmitted. Each statement by a party to a conversation is transmitted on a radio frequency, and a conversation usually comprises a series of separate discrete transmissions with periods of quiet in which no radio signals occur between individual transmission signal elements. In some instances, if the gap between remarks is short, a transmitter may remain active with no gap in the carrier signal of the radio transmission between remarks. When used for conversation, the result is a radio channel with a series of separate discrete transmissions, each with a relatively short duration, typically in the range of two to sixty seconds. Depending on the level of activity on a channel, this may generate a regular patter of activity, or there may be inactive gaps extending to hours between conversations.

For the sake a clarity, the terms 'channel', 'frequency', 'signal' and 'squelch' are used as follows. The term 'channel' refers to a discrete communications path for the transmission of certain classes of related content that may be independently identified at a radio receiver, regardless of whether this path is currently active with the presence of a radio signal or inactive without the presence of a radio signal, such as a radio broadcast frequency, a coded squelch broadcast signal, or trunked radio system talk group ID. The term 'frequency' refers to an actual radio broadcast frequency on which a communications signal is modulated or may be modulated, such as a conventional frequency or a trunked system working channel. The term 'signal' refers to a discrete period of activity on a channel, such as a single radio transmission, or a series of closely spaced but discrete transmissions. In some cases, evident by context, 'signal' may refer to the content currently present on a broadcast frequency. The term 'squelch' refers to a test determining whether a signal is present on a particular frequency; squelch is true when there is no signal, and unsquelch is true when there is signal.

In common speech there may be confusion between these terms. For instance, in conventional radio systems, there is typically a one-to-one regional correspondence between channels and locally active broadcast frequencies. This encourages a perceived equivalence between the terms, or blurring of meanings. However, the terms have different technical meanings herein.

Frequency agile receivers, commonly known as "scanners", are designed to receive signals on multiple communications channels by sequentially sampling ("scanning") predetermined channels until an active signal is detected, and holding on that channel to receive audio until the transmission or series of transmissions is complete. The scanner then resumes the scanning process to detect the next new signal. Typical scanners can scan hundreds of channels. Since any individual channel will typically have long periods of inactivity, this technology is a practical way to monitor communications on multiple channels with a single receiver, although it is typically not plausible to receive simultaneous communications on different channels with a single receiver.

When a single receiver is receiving a transmission on one channel, it is typically insensitive to any radio communications on other channels. As a limited exception to that principle, some scanners have a 'priority' feature wherein the scanner periodically retunes to a designated "priority" frequency to test for signal, at the cost of brief gaps in the reception of the present non-priority signal. This tradeoff provides for greater reliability in coverage of signals on the designated priority frequency, at the direct cost of performance in the reception completeness of all non-priority signals.

With respect to prior teachings of record by the inventor of the present disclosure, a first co-pending U.S. patent application Ser. No. 11/600,476 to Sullivan et al. filed on Nov. 16, 2006, (hereinafter "Sullivan-1") for a Network Audio Directory Server and Method, the contents of which are hereby incorporated by reference, was submitted by the inventors hereof. Sullivan-1 discloses a system and method of communicating audio through a network. Sullivan-1 addresses certain structure and techniques employed in the network environment. The method includes detecting audio content from an audio source by a first network terminal, sending a directory packet including a network address of the detected audio content to a second network terminal, and requesting the audio content through the network by the second audio terminal. The further step of storing the detected audio content in a buffer for audio packets identified by packet identities is added in some embodiments. The sending of a directory packet step may include sending a packet identity, and the requesting step may include specifying an audio packet according to the packet identity. A further step of sending a source packet including the network address of the detected audio content to a network directory server by the first network terminal may be added. Thusly, the directory server manages the requests and communication of audio content between feed source terminals and receiver terminals.

A first issued U.S. Pat. No. 8,125,988 issued on Feb. 28, 2012, Ser. No. 11/809,964, to Sullivan et al. filed on Jun. 4, 2007 (hereinafter "Sullivan-2") for a Network Audio Terminal and Method, the contents of which are hereby incorporated by reference, was submitted by the inventors hereof. Sullivan-2 discloses network audio feed source terminals, receive terminals and methods. Sullivan-2 teaches a receive terminal that includes a network interface that receives network packets and a network packet scanner coupled to the network interface that sequentially scans received network packets in accordance with scan criteria. A content selector is coupled to the network packet scanner, and selects network packets containing units of audio content from the scanned network packets based on selection criteria. An audio content processor is coupled to the content selector, and processes the audio content in the selected network packets. The network packets may include directory packets containing audio content addresses, in which case, the content selector further selects directory packets based on selection criteria. An audio packet requestor is coupled to the content selector and the network interface, and operates to request audio packets through the network identified by the audio content addresses that correspond to the selected directory packets. Sullivan-2 also teaches a network audio feed source terminal, which is used for coupling units of audio content from an audio source to a network. The feed terminal includes a source interface that receives audio content from the audio source and a content monitor that identifies audio content in accordance with monitoring criteria. The feed terminal also includes a means for capturing a selected portion of the identified audio content as units of audio content in accordance with capture criteria, and, a network interface that couples the units of audio content into the network.

A second issued U.S. Pat. No. 8,429,287 issued on Apr. 23, 2013, Ser. No. 12/432,009, to Sullivan et al. was filed on Apr. 29, 2009 (hereinafter "Sullivan-3") for a Network Audio Distribution System and Method, the contents of which are hereby incorporated by reference, was submitted by the inventors hereof. Sullivan-3 discloses audio content distribution from audio sources to client terminals through a network. An audio source interface receives raw audio from an audio source, and converts it into a digital audio clip in a digital audio packet, containing a timestamp and a channel identity corresponding to the audio source. A network audio server formats the digital audio packet into a network compliant digital audio file, which is stored at a network address. The network audio server generates a directory packet including the address of the digital audio file, the channel identity, and the timestamp, and, couples the directory packet to a directory server located on the network. The directory server outputs a directory stream to a client terminal on the network, which selects a directory packet and sends an audio file request through the network for the digital audio file. The audio file is then sent to the client terminal.

A second co-pending U.S. patent application Ser. No. 13/474,191 to Sullivan et al. filed on May 17, 2012 (hereinafter "Sullivan-4") for Channel Monitoring with Plural Frequency Agile Receivers, the contents of which are hereby incorporated by reference, was submitted by the inventors hereof. Sullivan-4 discloses a system and method to efficiently use a plurality of 'receivers' to monitor a larger plurality of 'sources' for audio content. Upon identifying that a source is active, one of the plural receivers is assigned to convey the content to a destination. All other receivers are prevented from monitoring that specific source for the duration of its activity, but continue to monitor the remaining sources. 'Source' includes any source of information containing audio content. 'Receiver' includes any device capable of selectively conveying such content, including physical switches, hardware or software multiplexers, microphones, radio receivers, or any other means of obtaining such content.

The teachings of Sullivan-1, Sullivan-2, Sullivan-3, and Sullivan-4 encompass certain illustrative embodiments useful in a range of systems and methods for network audio content acquisition, delivery and reproduction. Generally, these teachings amount to building blocks that can be arranged to yield a wide variety of network audio delivery systems. However, the implementation of a network wide system for audio content distribution to a wide variety of end users presents numerous architectural and protocol challenges, particularly with respect to system access security, reliability and integrity, system growth, and traffic management. Thus, it can be appreciated that there is a need in the art for a system and method for implementing and managing a system of plural network coupled audio sources for audio content and plural end user client terminals seeking access to such audio content.

SUMMARY OF THE INVENTION

The need in the art is addressed by the methods, apparatus, and systems of the present invention. The illustrative embodiments present a method of selecting a preferred audio recording of a discrete radio transmission. The method includes the steps of receiving, by plural radio terminals, a discrete transmission of audio content from a radio channel that has a channel identity, and, recording, and storing at a network address, an audio file of the discrete transmission, correspondingly, by each of the plural radio terminals. Then, sending a transmission report that includes the channel identity, a transmission time, and the network address, correspondingly, from each of the plural radio terminals to a channel manager. Next, selecting, by the channel manager, a preferred audio file of the discrete radio transmission by comparing the contents of transmission reports sent from the plural radio terminals, and, communicating the network address of the preferred audio file to a network destination.

In a specific embodiment of the foregoing method, at least a portion of the plural radio terminals include a land mobile radio scanning receiver, and the radio channel is land mobile radio channel. In a refinement to this embodiment, the radio channel is a logical channel that is partially specified a talk group code.

In a specific embodiment of the foregoing method, at least a portion of the radio terminals includes a memory, and the storing step includes storing the corresponding audio file in the memory. In a refinement to this embodiment, the network is the Internet and the at least a portion of the radio terminals includes an Internet web server, and the storing step further includes specifying an Internet URL as the network address, and, the Internet web server is responsive to a TCP/IP request that contains the Internet URL, to serve the audio file contents stored in the corresponding memory location.

In a specific embodiment of the foregoing method, where the discrete transmission of audio content is a single discrete transmission amongst an intermittent series of discrete transmissions of audio content, the method further includes isolating the single discrete transmission of audio content using a squelch circuit in a first radio terminal. In a refinement to this embodiment, an initial detection of the single discrete transmission of audio content by the squelch circuit defines the transmission time, which is correspondingly included in the transmission report. In a further refinement, the transmission time further includes a duration of the single discrete transmission of audio content, and the selecting step is accomplished by comparing the transmission time and duration of transmission portions of the transmission reports.

In a specific embodiment, the foregoing method further includes determining a quality factor of the audio file by at least a first radio receiver, incorporating the quality factor into at least a first transmission report, and the selecting step is accomplished by comparing the quality factor. In a refinement to this embodiment, the quality factor includes at least one of; signal strength, radio birdie detection, and inadequate audio level factors.

In a specific embodiment, the foregoing method further provides that upon selecting a preferred audio file, sending an upload command, including the channel identity and transmission time, to a first radio terminal, which generated the preferred audio file, and in response to receipt of the upload command by the first radio terminal, uploading the preferred audio file to a predetermined address in a network cloud storage server, and then sending a subsequent transmission report to a cascade server, which includes the subsequent network address of the preferred audio content, thereby enabling the cascade server to notify requesting network terminals of the predetermined address in the network cloud storage server of the preferred audio content.

The illustrative embodiment also teach a method of selecting audio recordings of radio transmissions for static network storage. The method includes receiving an intermittent series of discrete transmissions of audio content from a radio channel that has a channel identity, by a radio terminal that has a terminal identity, which includes a radio receiver, a memory, and a network file server. The steps of the method include recording, and storing in the memory of the radio terminal at a location identified by a first network address, a first audio file of a first discrete radio transmission. Then, sending a transmission report by the radio terminal corresponding to the first audio file, which includes the channel identity, the terminal identity, and the first network address, to a cascade server located on the network. Querying a subscription database, by the cascade server, for a list of plural client terminals subscribed to receive transmission reports according to the channel identity, and then forwarding at least a portion of the transmission report to the plural client terminals, thereby enabling the plural client terminals for selectively requesting a copy of the first audio file from the network file server of the radio terminal according to the first network address. Also, if the list comprises a quantity of plural client terminals greater than a predetermined value, sending an upload command, including the channel identity, to the radio terminal. In response to receipt of the upload command by the radio terminal, annotating the channel identity for static network storage, then recording a subsequent audio file of a subsequent discrete radio transmission by the radio terminal, and uploading the subsequent audio file to a predetermined address in a static network server, and sending a subsequent transmission report to the cascade server, which includes the channel identity and the subsequent network address, thereby enabling the cascade server to forward the subsequent transmission report to the plural radio terminals.

In a specific embodiment of the foregoing method, the querying a subscription database for subscribed terminals further include the step of querying according to the terminal identity.

In a specific embodiment of the foregoing method, where the network is the Internet, the network file server is an Internet web server, the first network address is an Internet URL, the sending step is accomplished using a TCP/IP protocol, the plural client terminals are internet terminals, and the selectively requesting step is accomplished using an http URL request. In a refinement to this embodiment, the static network server is an Internet cloud service provider.

In a specific embodiment of the foregoing method the radio receiver is a land mobile radio scanning receiver, and the radio channel is land mobile radio channel. In a refinement to this embodiment, the radio channel is a logical channel that is partially specified a talk group code. In a further refinement, isolating the first discrete radio transmission is accomplished using a squelch circuit in the radio receiver.

In a specific embodiment, the foregoing method further includes reverting to storage of audio files in the memory of the radio terminal if the quantity of subscribed terminals falls below the predetermined value.

The illustrative embodiments teach a radio terminal apparatus for scanning and recording audio files of discrete radio transmissions, and for reporting and serving corresponding audio files into a network to an external network terminal. The apparatus includes a frequency agile radio receiver that selectively tunes plural channels according to plural channel identities stored in a channel memory, so as to receive series of discrete transmissions of audio content, and, a squelch circuit that detects a discrete radio transmission of audio content by the detection of a start and an end of the discrete radio transmission. The apparatus also includes a processor coupled to selectively tune the frequency agile radio receiver and monitor the squelch circuit, and wherein the processor records, and stores in a memory at a location identified by a network address, an audio file of the discrete radio transmission, and the processor generates a corresponding transmission report of the discrete radio transmissions, which includes the channel identity, a transmission time, and the network address at which the corresponding audio content is stored. The apparatus further includes a network interface coupled to the processor, and a network file server coupled to the processor. In operations, the processor communicates the transmission report through the network interface to the external network terminal, thereby enabling the selection and request for audio content though the network from the network file server according to the network address in the transmission report. Furthermore, the network file server is responsive to a request for audio content received through the network to recall an audio file from the memory according to a specified network address, and upload the audio file into the network.

In a refinement to the foregoing apparatus, the network interface is compliant with an Ethernet local area network (LAN) switch, which serves as the external network terminal, and operates to register therewith to receive a LAN address therefrom. Furthermore, the processor communicates the transmission report to a LAN terminal address, and the network file server is responsive to audio file request from the LAN terminal address to download audio content thereto.

In a specific embodiment of the foregoing apparatus, the processor includes geographic data and a textural descriptor of a service type, which utilizes the radio channel corresponding to the channel identity. In another specific embodiment, the processor incorporates a start of transmission time and a duration of transmission time in the transmission time portion of the transmission report.

In a specific embodiment of the foregoing apparatus, the processor evaluates the signal content of the audio file to determine a quality factor of the audio file, and the processor incorporates the quality factor into the transmission report. In a refinement to this embodiment, the quality factor includes at least one of; signal strength, radio birdie detection, and inadequate audio level factors.

In a specific embodiment of the foregoing apparatus, where the network is the Internet, the network file server is an Internet web server, the network address is an Internet URL, the processor communicates the transmission report with a TCP/IP protocol, and the request for audio content utilizes an http URL request to the Internet web server.

In a specific embodiment of the foregoing apparatus, where a static audio file server is located on the network, which stores and distributes static audio files to network client terminals, then the processor is responsive to an upload command received through the network interface to upload a copy of the audio file to the static audio file server. In a refinement to this embodiment, the processor is further responsive to the upload command to generate a subsequent network address on the static audio file server at which the audio file is stored, and the processor generates a subsequent transmission report incorporating the subsequent network address, and communicates the subsequent network address to the external network terminal.

In a specific embodiment of the foregoing apparatus, where a static audio file server is located on the network, which stores and distributes static audio files to network client terminals, then the web server monitors the number of upload request for the audio file, and the processor generates an internal upload command if the number exceeds a threshold value, and uploads a copy of the audio file to a subsequent network address on the static audio file server, and generates a subsequent transmission report incorporating the subsequent network address.

DESCRIPTION OF THE INVENTION

Figure 1:
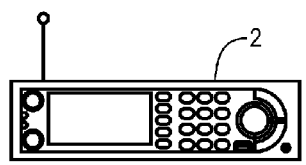
FIG. 1 is a front view of a scanning receiver according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The illustrative embodiments of the present invention enable land mobile radio scanning capabilities using geographically distributed scanners that are designed to operate in a network environment, primarily the Internet, using the addressing schemes, protocols, and connectivity models supported by the various Internet protocols. Generally speaking, the present invention is a system and method for capturing, recording, notifying, and distributing audio files of discrete intermittent radio communications, each of limited duration, and each associated with a unique channel identity and broadcast time. The systems and methods are generally applicable to land mobile radio system broadcasts and web enabled computing devices. However other types of radio transmission can also apply, as well as other types of networked environments. Other applications will become evident to those skilled in the art upon review of the teachings contained herein.

The illustrative embodiments are generally server and client network implementation, primarily intended for use over the Internet, or other TCP/IP private and public networks. Unlike prior art techniques for distributing audio feeds through the Internet, the present invention does not rely on streaming audio techniques. Rather, it is an index-based system and method. The distribution process is broken into three components. First, radio terminals scan radio systems and communications channels to capture and record audio content carried in discrete radio broadcasts, and generate a corresponding transmission reports indicating the availability of the captured audio content. Second, client terminals are made aware of audio content available on the network by communication of the transmission reports to the client terminals, and the client terminals then have control over the selection of audio content from amongst all of the audio content the terminals are made aware of Third, the client terminals selectively request the audio portion of selected content and reproduce that audio content for the user.

In certain embodiments, transmission reports are communicated to client terminals from a server in near real-time within a "pushed" stream of transmission reports. In other embodiments, the client terminals "pull" the transmission reports by making repeated requests to a server for new transmission reports, which are then immediately communicated to the client terminal, also enabling a near real-time acquisition of reports. Thusly, the client terminal is promptly notified of newly available audio content as it is captured and reported by radio terminals operating in the system. In other embodiments, enabling access to previously submitted audio content, a server provides historical records of transmission reports recorded at a prior time, to the client terminals. This structure enables client terminals to access current audio content as it becomes available on the system, and also enables the client terminals to acquire audio content the was created and made available at a prior point in time.

It is noteworthy that land mobile radio systems are implemented in a complex fashion, with geographically distributed radio transmission sites, plural radio frequencies at each, and even more channel identities. These radio resources are utilized by a wide range of government, business and private user groups. Many of the user groups interact with one another. For example, the local police department commonly interacts with local fire and EMS services. There is a geographic component as well, in that related user groups are generally in geographic proximity to one another, as are the radio transmission sites they rely upon for communications. User who monitor land mobile radio broadcasts are generally follow some related series of discrete intermittent radio broadcast so as to follow the 'action' occurring within these related user groups. Users generally follow the 'action' in their local region. However, some 'action', such as disaster or major emergency, draws interest from a wider base of users. In this case, network delivery of audio content beyond the radio range of broadcast system can enable user enjoyment. This the user who listens from a remote area dose not do so with a radio receiver, but rather and audio receiver connected to a radio receiver through the network. In this disclosure the radio receivers and scanners that capture radio broadcasts and that are connected to the network are referred to as radio terminals. The audio receivers that are connected to the network are referred to as client terminals.

Reference is directed to FIG. 1, which is a front view of a radio terminal 2 according to an illustrative embodiment of the present invention. The radio terminal 2 is similar in appearance to a multi-band scanning radio receiver typically employed to monitor intermittently transmitted audio content in the land mobile radio environment. The radio terminal 2 of the illustrative embodiment differs in that it includes further hardware and functions that enable LAN and Internet connectivity, the ability to capture and record audio files, and to store them in a memory at network addressable locations, and a network file server function that allows the radio terminal to respond to requests for specific audio files, among other features and functions that will be more fully discussed hereinafter.

Figure 2:
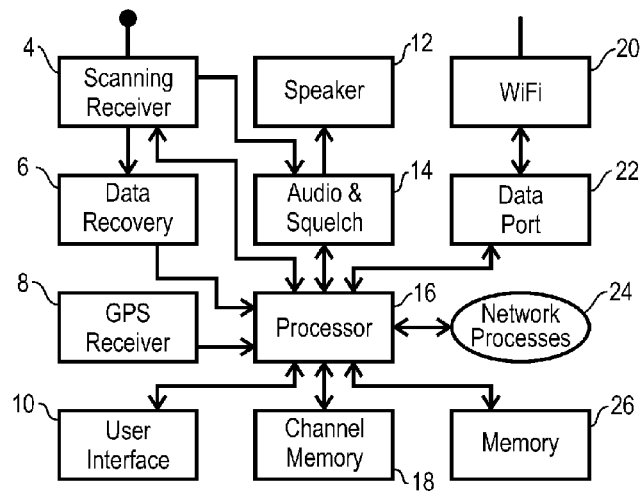
FIG. 2 is a functional block diagram of a scanning receiver according to an illustrative embodiment of the present invention.

Reference is directed to FIG. 2, which is a functional block diagram of the radio terminal 2, referred to on FIG. 1, according to an illustrative embodiment of the present invention. The functional block diagram of FIG. 2 reveals some of the internal components that enable the capabilities of the radio terminal. The radio terminal 2 includes a scanning radio receiver 4, which is a frequency synthesized multi-band receiver cable of tuning and receiving land mobile radio, and other services, in the LF, HF, VHF, UHF, 800 MHz, and higher radio frequencies, and which may be modulated by AM, FM, and by digital techniques. A data recovery circuit 6 enables the radio terminal to decode digital squelch control signals, as well as trunking system control signals. The decoded data is couple to a processor 16, which executes software to enable various features and functions of the radio terminal 2. An audio and squelch circuit 14 is couple to the scanning receiver 4 and the processor 16. This circuit is used to detect carrier squelch and to amplify and route audio band signals that are demodulated by the scanning receiver 4. The amplified audio signals may be coupled to a local loudspeaker 12. In addition, the audio signals may be digitally sampled and converted into digital audio files, which are processed by the processor 16, and can be stored in a local memory 26 at network addressable locations.

The processor 16 controls the operation of the scanning receiver 4, which includes the capability to store and recall specific radio channel information within a channel memory 18. The channel memory holds a range of information about each channel that is programmed into the radio terminal 2. Among these are the frequencies, or frequencies, of reception, squelch control data, geographic information about the channel, the radio service user type (police, fire, etc.) customizable text fields, and certain flags and user settings useful in the radio terminal's operation with the systems and methods of the illustrative embodiment. The radio terminal 2 also includes a user interface 10, which comprises a display, volume and squelch level controls, and various key actuators for controlling operation of the radio terminal 2. The memory 26 contains general program memory, transmission report memory, and also the audio file storage. A GPS receiver may be included to provide geographic location information to the processor 16. Geographic location information is useful when programming radio channels into the channel memory 18, so as to select channels that are like to be within radio range of the scanning receiver 4. Geographic information can also be incorporated into transmission reports generated by the processor 16 during routine reception and reporting operations.

The radio terminal 2 of FIG. 2 includes network connectivity and certain network processes, which are represented by the network process element 24. The network processes actually reside in a programming portion of memory 26 and/or processor 16, as will be appreciated by those skilled in the art. A data port 22 is provided for interface to an external network (not shown). An Ethernet port is a suitable data interface, as this is the most common connection for local area network (LAN) routers, WiFi routers, and various Internet modems. In fact, an IEEE 802.11 (et seq.) wireless transceiver (WiFi) 20 may be included in the radio terminal 2 so as to facilitate Internet connectivity. Various network process 24 are supported, including TCP/IP registration with a LAN router, TPC/IP communications via http with the Internet, as well as other transport protocols, and an network file server function, which may be a web server that processes file requests from external network terminals according the Internal URL addresses, for audio files stored in the memory 26.

Figure 3:
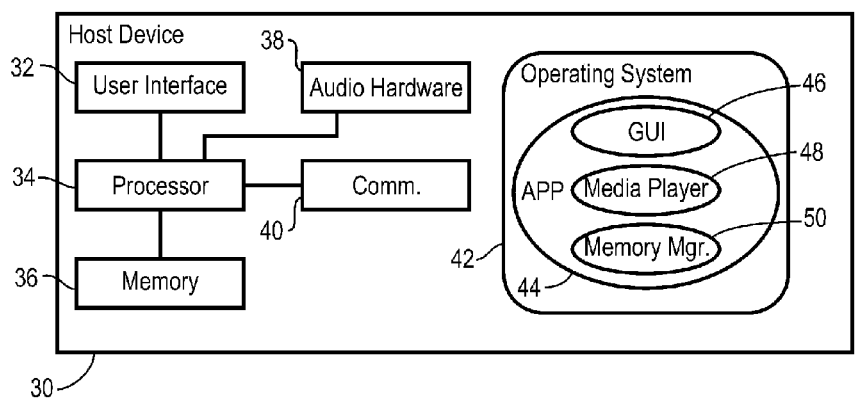
FIG. 3 is a functional block diagram of a client terminal according to an illustrative embodiment of the present invention.

Reference is directed to FIG. 3, which is a functional block diagram of a client terminal 30 according to an illustrative embodiment of the present invention. In a general sense, a client terminal is any network connected device that receives transmission reports identifying available audio content, which can then select particular audio content based on the content of transmission reports, and then make a request for that audio content through the network. In an illustrative embodiment, the network is the Internet, and the audio file requests include the URL of the desired audio content, which is requested from a web server located at an IP address, or through a proxy server, as will be appreciated by those skilled in the art. The content of transmission reports include other information, which can also be used by the client terminal in order to select desirable audio content. In various illustrative embodiments, the client terminal 30 is a processing device that has network connectivity and a software operating system that can serve as a host environment for application software the embodies the client terminal functionality. For example, a PC computer can serve as a client terminal. Due to the user desire for portability, a smart phone device, such as an iPhone® or Android® device, is a good choice of a host device for a client terminal 30. Of course, other devices that presently meet the aforementioned essential criteria, or devices not yet know, can server as the host for a client terminal 30.

A typical illustrative client terminal 30 in FIG. 3 includes a processor 34 coupled to a memory 36 and a network communications interface 40, such as a 4G wireless network, a WiFi® transceiver, or wired network interface. The client terminal 30 also requires some audio hardware 38 for routing or reproducing audio files, and a user interface 32 with a display and user input controls, such as a touch screen of keypad. The client terminal 30 also includes a software operating system 42, which can host the illustrative embodiment application program ("APP") 44. The APP 44 embodies the functionality of the client terminal in the host device, and includes a graphical user interface (GUI) 46, a media player 48, and a memory manager 50. The APP 44 is enabled to communicate through the network with various components of the systems and methods of the present invention, including radio terminals, channel managers, cascade servers, service provides, and various database services, as will be more fully discussed hereinafter.

Figure 4:
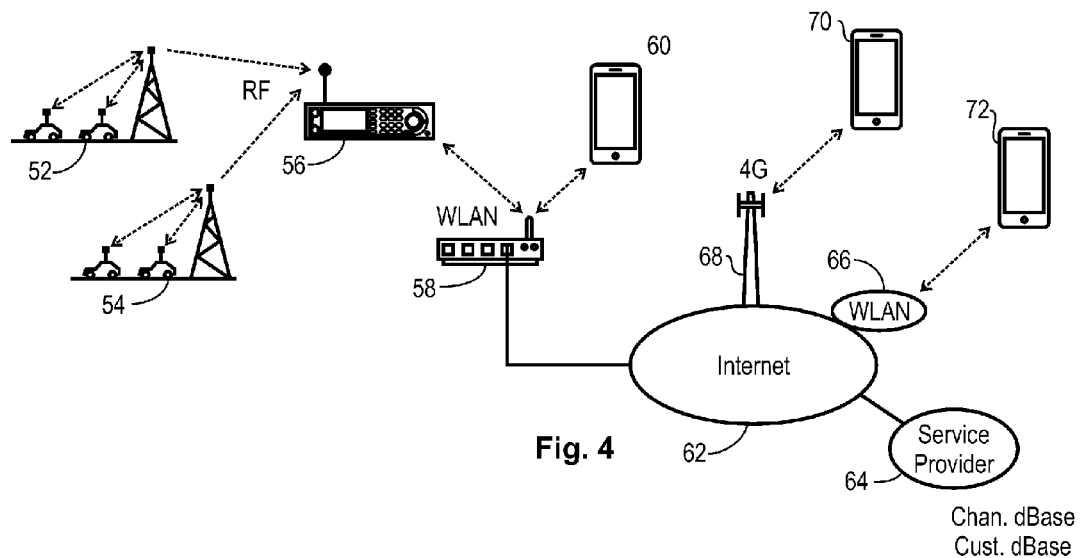
FIG. 4 is an individual user system diagram according to an illustrative embodiment of the present invention.

Reference is directed to FIG. 4, which is an individual user system diagram according to an illustrative embodiment of the present invention. Having the concept of a radio terminal and client terminal, as well as the connectivity of networks, including LAN, WAN (wide area network), and the Internet, introduced, it is useful to consider exemplary operational systems in which theses components and other features and function of the illustrative embodiments operate. The first is illustrated in FIG. 4, which is typical of how an individual user might employ the teachings of the present invention. A radio terminal 56 scans radio frequencies carrying radio channels from plural land mobile radio systems 52, 54. As the radio terminal 56 receives intermittent broadcasts carrying audio content, the radio terminal 56 captures these individual intermittent transmissions, and records them as individual audio files stored according to network addresses, which may be Internet URL addresses, in the radio terminal 56 memory. The radio terminal 56 also sends a transmission report, correspondingly, into the wireless LAN (WLAN) to a predetermined network address that may have been assigned by WLAN router 58. In this example, that network address is a LAN address that has been assigned to smart phone 60, which is running an APP as discussed hereinbefore. Thus, the smart phone 60 is made aware of the existence of each newly captured audio file be receiving its corresponding transmission report. Each transmission report.

The smart phone 60 is thus enabled to examine the contents of each transmission report to determine if the corresponding audio file is of interests. All of these processes occur quickly, and thus appear to be in real time, subject mainly to processing and network latency. The selection of which audio content is of interest can be based in a number of factors present in the transmission report, and may be based on the channel identity, the service type, priority, system, talk group, and other factors. If a transmission is deemed to report desirable audio content, then the APP in the smart phone 60 makes a request for the corresponding audio file to the network file server in the radio terminal 56. The network file server then sends the requested audio file through the LAN 58 to the smart phone 60, which can reproduce the audio for the user. Again, these processes occur quickly and appear to occur in real time. Thus, the net effect is that the smart phone 60 operates in a manner very similar to that of the radio terminal 56, and give the user smart phone scanner capability that can be utilized anywhere within the coverage of the WLAN 58. Since most modern LAN and WLAN devices implement there network functionality using the TCP/IP family of protocols, then the system of the illustrative embodiment is readily scalable into Internet distribution of transmission reports and audio file distribution.

Expanding the functionality of the system of FIG. 4 is initially a matter of assigning IP addresses to the various devices. This is not difficult in that most modern WLAN routers are already connected to the Internet and already function as proxies to user's service provider assigned IP addresses, as is well known in the art. Similarly, most modern smart phones 60, 70, 72 are already addressable through there respective wireless service providers, such as 4G network services providers, which is also well known in the art. Given Internet connectivity, the radio terminal 56 can route transmission reports through the Internet 62 and a 4G network 68 to a smart phone 70 located anywhere in its wireless network. Other smart devices with WiFi® connectivity can also be addressed on the Internet. Accordingly, the radio terminal 56 can route transmission reports and serve audio content through the Internet 62 and through a WiFi® WLAN to any such device 72 on the Internet. Thusly, a user and roam the Internet and still receive the scanning transmissions from their radio terminal. Again, all of this occurs in near real time.

Since Internet connectivity is available to radio terminal 56 in FIG. 4, the radio terminal 56 is enabled to access services from a service provider 64 through the Internet 62. This enables several functionalities utilized in the illustrative embodiments. First, is access to a national channel database. With this access, the radio terminal 56 can report its geographic locations, by ZIP code, political boundaries, or GPS coordinates, and thus receive various channels from the channel database without manual programming by the user. This programming can also be updated as the radio terminal moves about geographically. Secondly, the radio terminal 56 can register with a customer database and receive a customer ID code, as well as certain default Internet addresses for accessing various other services. The service provider 64 may charge for such services, and the radio terminal can establish an account with credit and so forth. The service provider can also make recommendations for programming configurations and offer other services, and etc.

Figure 5:
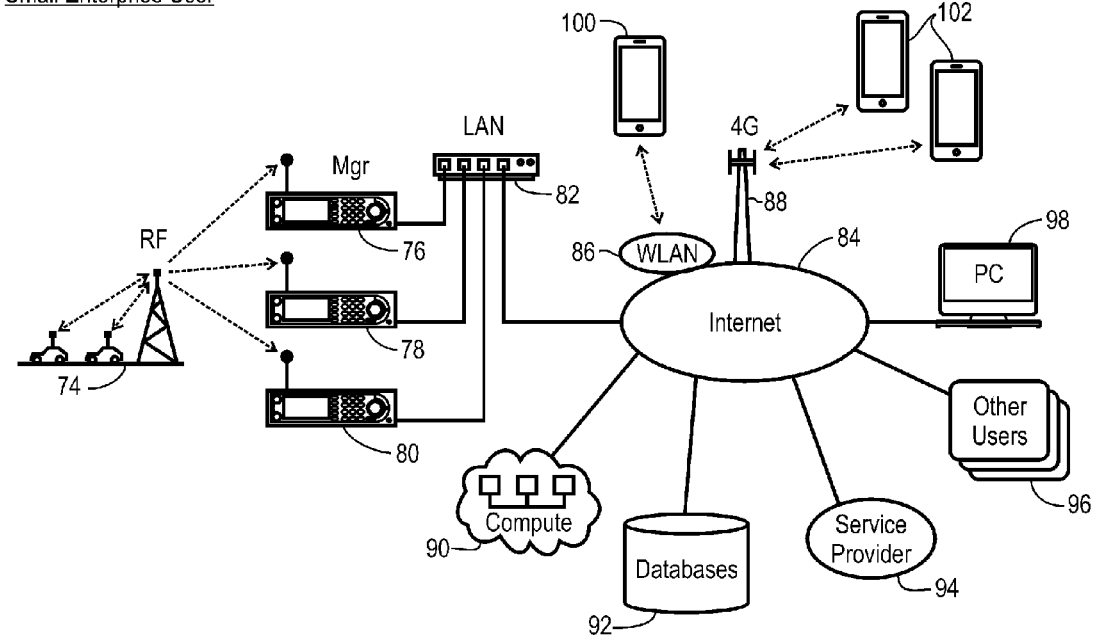
FIG. 5 is a small enterprise user system diagram according to an illustrative embodiment of the present invention.

Reference is directed to FIG. 5, which is a system diagram of an exemplary embodiment for a small enterprise user according to an illustrative embodiment of the present invention. This is the second exemplary system level embodiment, and shows a basic configuration for a small enterprise user taking advantage of the teachings of the present invention. For example, this might be a useful system for a local police department, which desires to provide client terminals to officers to listen to police radio traffic while off duty, but without having to provide an expensive police service radio to each officer. A significant aspect of this type of user is the need to provide nearly 100% reception reliability of its land mobile radio system 74 by the radio terminals 76, 78, 80. Such police radio systems 74 are usually trunked radio systems having five or more shared radio channels. In the case of a single radio terminal, it is readily apparent that while the radio is capturing a first discrete intermittent signal, there may be other signals simultaneously transmitted, that a single radio cannot physically receive. So, some transmissions are never received nor captured. For casual listening, this is typically not a great concern. However, in the case of the small enterprise user of FIG. 5, they may want nearly 100% reception reliability. Just as in other shared services, trunking theory can be utilized so that plural radio receivers 76, 78, 80 can be employed to monitor a single land mobile radio system 75, thereby greatly increasing the likelihood of reception and capture an any given discrete intermittent transmission by the system 74.

The subject matter of operating plural scanners to monitor a single system was fully addressed in the Sullivan-4 patent application incorporated in the Background of the Invention section herein before. A portion of the teachings of Sullivan-4 are presented in summary fashion to assist the reader in understanding the functional benefit of those teachings, which are referred to now as the "Multi-Sync" system. These teachings are presented in regards to FIGS. 6 (A-D). Under the teachings of the present invention, one of the plural radio terminals is designated as a "cluster manager", which supervises the operation of the other members of each cluster. The cluster is the group of radios cooperatively monitoring a given group of channels, thereby providing the Multi-Sync capability. As each radio terminal detects a transmission, it reports that action to the cluster manager, which advises the other radio terminals in the cluster to avoid that channel and continue scanning for other discrete intermittent signals. Consider the follow discussion of FIGS. 6 (A-D) to understand the benefit of this arraignment.

Figure 6A:
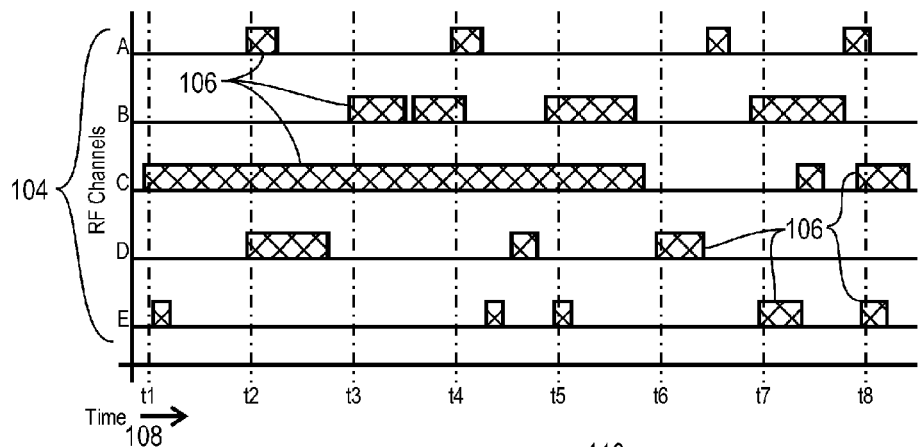
FIGS. 6A, 6B, 6C, and 6D are receiver signal timing diagrams according to an illustrative embodiment of the present invention.
Figure 6B:
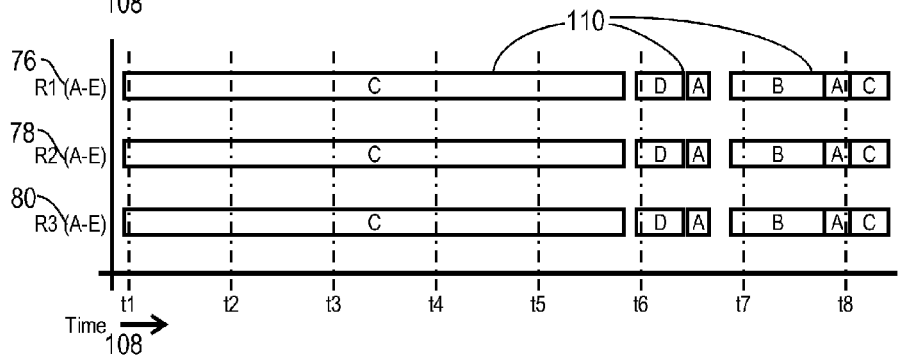
Figure 6C:
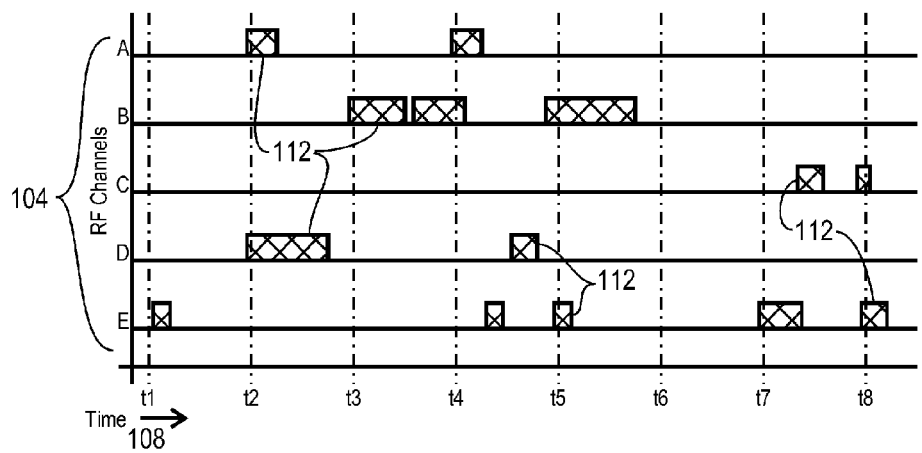

Reference is directed to FIG. 6A, FIG. 6B, and FIG. 6C, which together illustrate the aforementioned issue of scanning multiple channels with plural receivers that are all programmed to scan the same channel list. FIG. 6A illustrates exemplary signal activity 106 on five channels 104 that are labeled A, B, C, D, and E. Time 108 passes through intervals labeled t1, t2, t3, t4, t5, t6, t7, and t8. Note that the signals 106 are discrete transmission using transmission trunked communications and intermittent in nature. FIG. 6B illustrates a reception timing diagram of the three scanning radios labeled R1 76, R2 78, and R3 80 that are all programmed to scan all of the channels A, B, C, D, and E illustrated in FIG. 6A. As a practical matter, transmission trunked signal segments 106 range in duration from a few seconds and longer. On the other hand, the channel scan rate of modern scanning radios is a few milliseconds. Thus, for this exemplary analysis, it can be assumed that the scan rate is virtually instantaneous since there are just five channels on the scan list. Thus, what FIG. 6B demonstrates is that all three radio terminals 76, 78, and 80 received exactly the same channel signals by reason of the sequence in which the signals appear in time. Note that the long duration signal on channel C is captures by all of the radios. Now, if the captured signals 110 in FIG. 6B are subtracted out from the total signals 106 in FIG. 6A, what remains are the un-captured singles. The un-captured signals 112 are illustrated in FIG. 6C. This is an unacceptable loss of signal capture to en enterprise user, such as is discussed regarding FIG. 5.

Figure 6D:
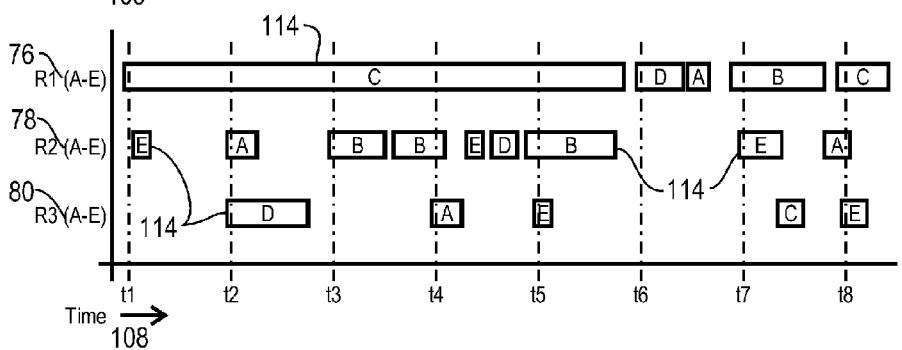

Reference is now directed to FIGS. 6A, and 6D, which demonstrate reception performance when the Multi-Sync technology and a unified scan list is employed. Again, FIG. 6A illustrates exemplary signal activity on five channels 104 that are labeled A, B, C, D, and E. Time 108 passes through intervals labeled t1, t2, t3, t4, t5, t6, t7, and t8. Note that the signals 106 are transmission trunked and sporadic in nature. FIG. 6D illustrates reception timing for three radio terminals, R1 76, R2 78, and R3 80. The cluster manager 76 is programmed with a unified scan list and directs the radio terminals R1, R2, and R3 to avoid scanning and capturing of any signal that is already being received and captured by another of these radio terminals. Thus, any radio terminal that is in the scanning mode of operation will not scan and receive a signal already being received. This enables the most efficient utilization of the radio terminals for capture on the maximum number of signals, which is the simultaneous capture of three independent signals. Now, if the captured signals 114 in FIG. 6D were subtracted out from the total signals 106 in FIG. 6A, what remains are the un-captured singles, and in this example, there would be no uncaptured signals. Contrast this with results illustrated in FIG. 6C, and the reader will quickly appreciate on of the advantages of the Multi-Sync invention.

Now, returning to FIG. 5, a first radio terminal 76 is designated as the cluster manager, while the remaining two radio terminals 78, 80 are members of the same cluster. All of the radio terminals are connected to a LAN 82, which provides Internet 84 connectivity. A service provider 94 provides the essential database and customer services and manages system level addressing and identity coordination. Since these radio terminals 76, 78, 80 are in a cluster, all are programmed with the same list of channels and all monitor the same radio system 74, yet receive the benefits of the aforementioned Multi-Sync system for scanning efficiency. When the small enterprise user of this illustrative embodiment initially sets up the system, the radio terminals are registered with a customer database amongst several other databases 92 that are hosted by a web database service and managed by the service provider 94. At this time, the first radio terminal 76 is designated as the cluster manger and the cluster is assigned a cluster identification by the system. This information is retained in a system level cluster database 92. All three radio terminals 76, 78, 80 are programmed from a channel database 92. In addition, certain IP addresses are configured for initial communications. Also note that since web-based resources are employed, even the service provider's 94 computer processing 90 is web based. The audio files can also be selectively web hosted in other embodiments. as opposed to hosting in the radio terminals themselves. In this illustrative embodiment, Amazon.com RDS (relational database service) is used to host all the databases 92, and Amazon.com EC2 (Elastic Compute Cloud) service is used as the computing resource 90. It will be appreciated that such resources are also available from other providers as well.

Each of the smart phone devices 100, 102 also download an APP program, either from an APP service, such as Apple Computer iTunes®, or from a database 92 provided by the service provider 94. The smart phone devices are paired with the system, and receive initial IP addresses from the customer database, thereby enabling communication of transmission reports and request for audio files from the web servers in each of the radio terminals 76, 78, 80. The smart phone devices may either communicate through a 4G wireless network 88 or through WLAN service providers 86. Note that the small enterprise user of this illustrative embodiment may operate a console terminal 98 in the system to control access and configuration of its several radio terminals 76, 78, 80, and client terminals 100, 102.

The illustrative embodiment of FIG. 5 exemplifies other noteworthy aspects of the present invention. As was note hereinbefore, each of the client terminals 100, 102 selectively listens to channels. That is to say that each user chooses what channels they want there terminal to listen for, and to reproduce as audio. For example, the trunked system 74 may carry both local fire and police communications, and a particular user may want his client terminal to reproduce just the fire department communications. The radio terminals are capturing both, and sending transmission reports for both to all the client terminals 100, 102. This the user of the client terminals 100, 102 select both the radio terminals they desire to monitor and the specific channels they want. Thus, they specify both the source of the content (i.e. the radio terminals specified by the aforementioned cluster identification) and the specific channels they want to reproduce (i.e. the fire department).

This is referred to as channel/source monitoring, which is different from other types of monitoring that will be discussed hereinafter. Another noteworthy concept is how audio content is stored, and how reliable that storage is. In this illustrative embodiment, the audio content is stored in the radio terminals 76, 78, 80 and is served into the network 84 by web servers in the radio terminals. This is referred to herein as "volatile" storage. It is volatile in at least two senses. First, the storage capacity of each radio terminal 76, 78, 80 is finite, and as it is filled with new audio content, some of the older content must be overwritten. Second, the availability of the audio content requires that the specific radio terminal be powered on and connected to the network. For an enterprise user, the chances are good that the radio terminal will be maintained, powered and serviced as needed. But in the case of private users, a radio terminal may simply be turned off, and thus the storage and availability of audio content from its web server is highly volatile in nature.

Figure 7:
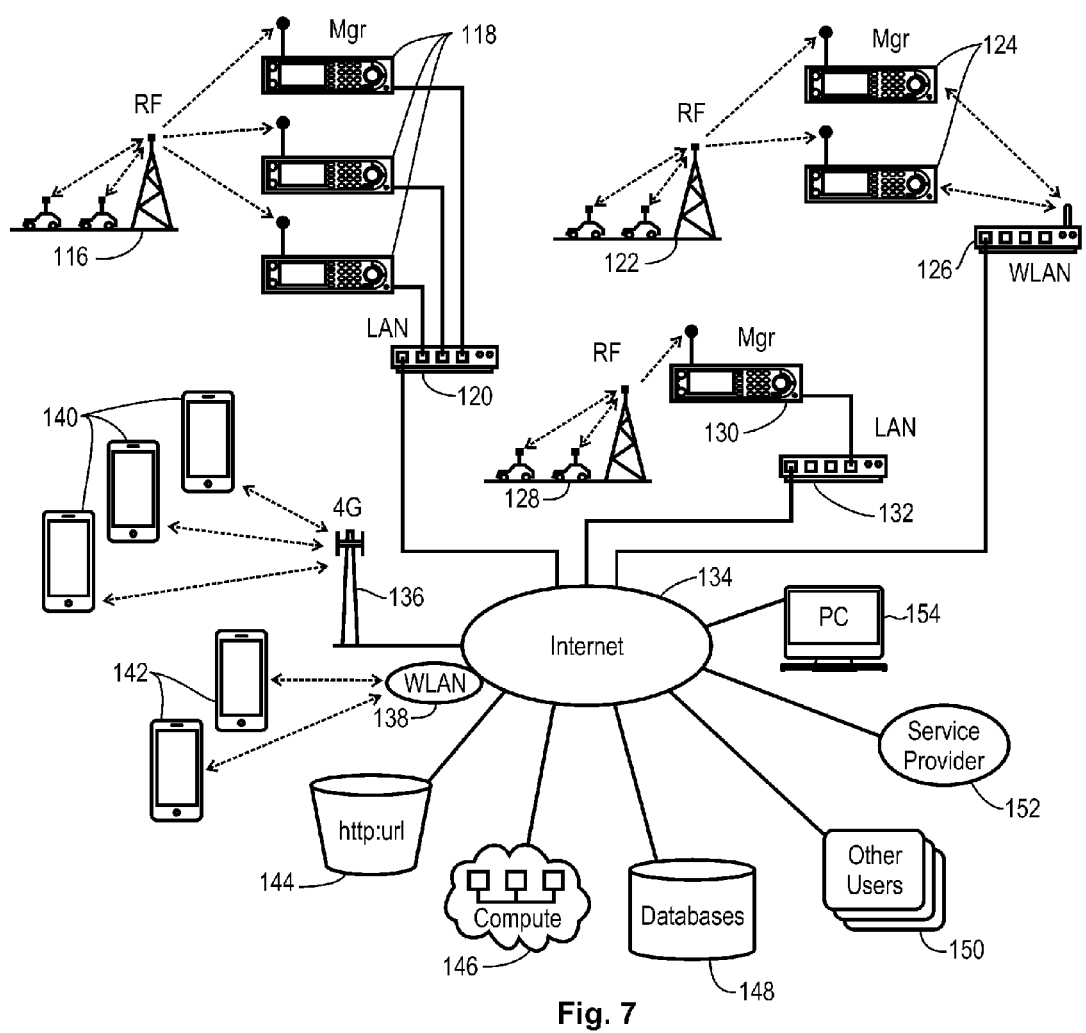
FIG. 7 is a large enterprise user system diagram according to an illustrative embodiment of the present invention.

Reference is directed to FIG. 7, which is an exemplary large enterprise user system diagram according to an illustrative embodiment of the present invention. The large enterprise user differs from the small enterprise user in that more radio systems are monitored using a larger number of radio clusters, and more robust audio storage is employed along with more capable hosting and processing service, such as cloud computing resources. A large enterprise might be a news organization that needs to monitor several radio systems and provide information to many users throughout a region. In FIG. 7, there are three radio systems 116, 124, 130 being monitored using three radio terminal clusters 118, 126, 130, respectively. Note that the radio systems may be trunked or conventional, and may employ any squelch control system and many different channel configurations. Also note that the radio terminal clusters 118, 124, 130 may comprise a single radio terminal or plural radio terminals. Each radio terminal cluster 118, 124, 130 is coupled to a respective LAN or WLAN resource 120, 126, 132, which provides Internet 134 connectivity. The radio terminal are initially registered with a service provider 152 customer database, they are initially assigned a cluster identification form a cluster database, and their channel memories are selectively programmed from a channel database. All of these databases are stored in a cloud computing database resource 148 that is managed by the service provider 152. The large enterprise user may also operated a console terminal 154 to administer its system functions through the Internet 134.

Through set-up and programming, the large enterprise user installs the monitoring stations and programs the radio terminals to monitor the several radio systems and channels that are desired for monitoring. Thus a larger number of discrete radio transmissions are captured and recorded, and a large number of transmission reports are generated, and are then distributed so that various client terminals can selectively request the corresponding audio content. Assuming that the news organization desires to keep a more permanent record of the audio content that is captured. The aforementioned volatile storage in the radio terminals may be deemed to be less reliable than desired. In this case, the audio content can be uploaded from the several radio terminals to a cloud computing based web server 144. This is referred to as "static" storage. Static storage provides greatly increased storage space, longer term retention and more reliable service. In this example Amazon 'S3' Simple Storage Service is employed, which allows the audio content to be stored at web addresses according to URL locators. In fact, the decision to transition fro volatile to static storage can be dynamic, based on various factors including use and demand of the system.

As discrete transmissions from the several radio systems 116, 122, 128 in FIG. 7 are captured, the radio terminal clusters store them at web addressable locations in the on-line cloud storage service 114, and also send out transmission reports to announce the availability of each subsequent discrete audio file. Each transmission report needs to be sent to all subscribed client terminals 140, 142. This concept requires a subscription database, which is hosted in the cloud database service 148 in the illustrative embodiment. While the radio terminals 118, 124, 130 could distribute the transmission reports directly, it is beneficial to employ a process running on a computing resource that has greater capacity and speed. This is done using a web cloud service processing resource, such as the Amazon EC2 cloud processing resource 146 in the illustrative embodiment. This aspect of the illustrative embodiments will be more fully described hereinafter. Ultimately, the transmission reports are delivered to the several client terminals 140, 142, and then the client terminals selectively request corresponding audio content from the web storage and server service 114. The delivered audio content can then be reproduced for user listening by the client terminals 140, 142. The client terminals may connect to the Internet 134 via a wireless network 136 for through various WLAN access points 138. It is noteworthy that once the transmission reports and audio files are web accessible, then it is possible to share this information with other users 150 located across the Internet.

Figure 8:
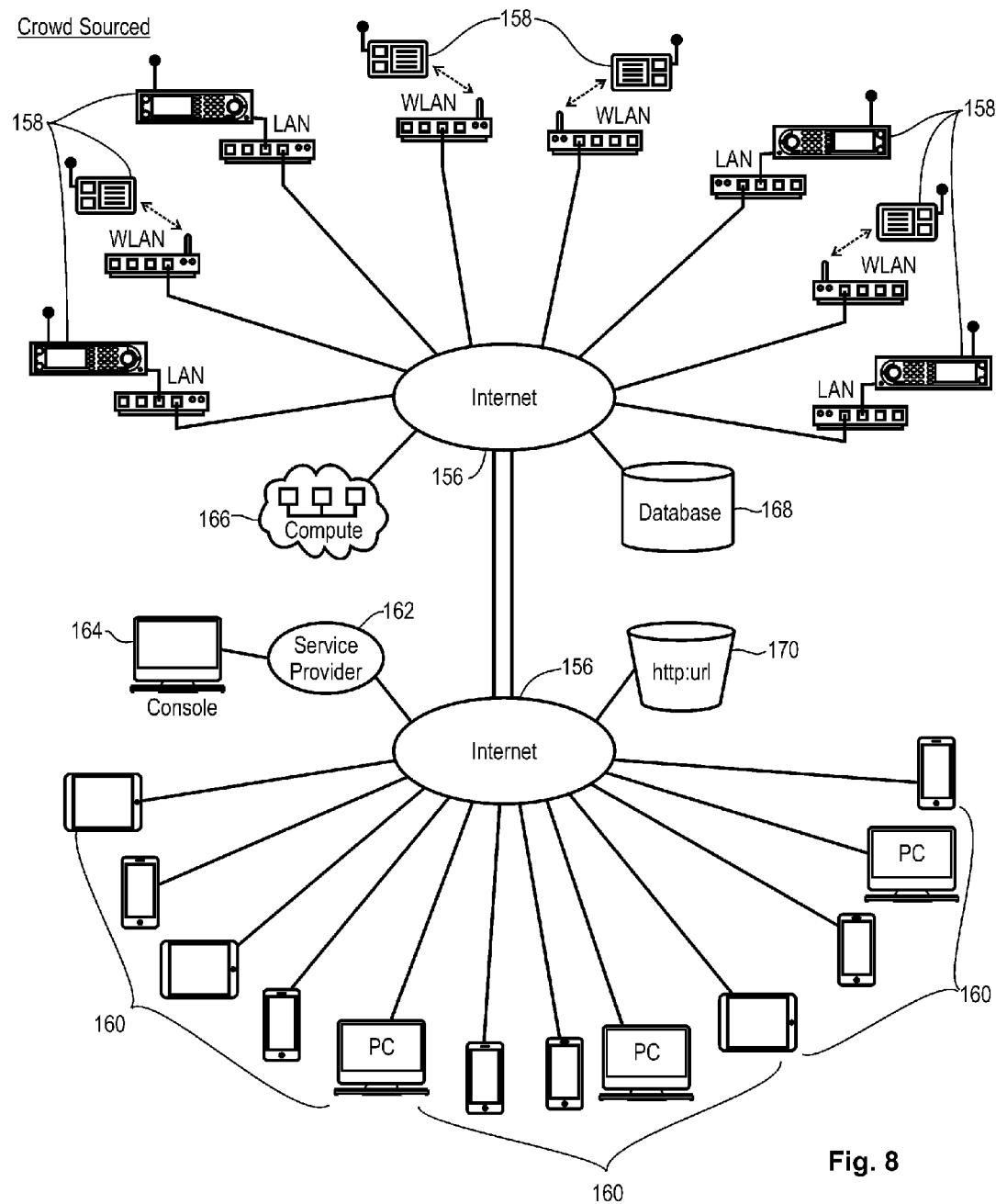
FIG. 8 is a crowd sourced system diagram according to an illustrative embodiment of the present invention.

Reference is directed to FIG. 8, which is system diagram of a crowd sourced application of the present invention according to an illustrative embodiment of the present invention. Considering the foregoing discussions, the present invention enables the storage of both transmission reports and audio file content at network locations, including cloud computing resources. Thus, any radio terminal with network access can upload transmission reports to a server, and any client terminal can subscribe to channels for receiving transmission reports. Then, selectively download desirable audio content either from the radio terminals that host it, or from audio content servers if such audio content have been uploaded to a network server resource. In other words, a crowd of radio terminals can sources content for a crowd of client terminals. FIG. 8 illustrates such an embodiment. The Internet 156 is the host network, with plural radio terminals 158 coupled to the Internet 156, feeding transmission reports of available audio content form discrete radio transmissions that have become available. These transmission reports are stored in databases 168 and served by processors 166. Audio content files can either be served from the plural radio terminals 158 or uploaded to a cloud based web server 170. The transmission reports indicated the storage address of the corresponding audio content. A service provided 162 manages the customer identities, a national channel database, and cluster databases of the plural radio terminals 158, using a console interface 164.

Having the crowd of radio terminals 158 feeding transmission reports and audio files into the network 156 to databases 168 and servers 170, a crowd of client terminals 160 is enabled to monitor transmission reports and selectively request audio content. Client terminals 160 can be any of several types of network connected processing device that run an operating system that can host a client terminal application program (APP), including smart phones, tablet computers, personal computers, and other similar devices. Note that the client terminals 160 also register with the service provider 162 to receive a customer ID, and then select desirable channels to monitor. Once selected, a transmission report server, referred to herein as a cascade server (not shown), communicates the corresponding transmission reports to the respective client terminals 160. The client terminals 160 then examine the contents of received transmission reports, and selectively request audio content through the network 156. The audio file web servers (not shown) respond by communicating the requested audio content back to the requesting client terminal, which can then reproduce the audio content for user listening.

The crowd sourced embodiment with transmission report distribution and audio file servers enables certain advanced features for users of this system. For example, routine transmission can be stored and served from individual radio terminals using the aforementioned volatile storage approach. This means that the audio content storage will be distributed throughout the crowd of radio terminals 158, and relatively shorted lived, which is acceptable in most applications due to the fleeting nature of land mobile radio communications. However, in case where the communications are more interesting or important, the system can upload the audio files on an as-needed basis to static network storage. This addresses the problem of larger numbers of audio file requests to a radio terminal that has limited processing power or limited network bandwidth. In addition, it is likely that a single radio system may be monitored by plural radio terminals. For example a metropolitan police department might have a large number of radio terminal users listening in. Therefore, the system can compare the quality and reliability of transmission reports and select the best available audio content for distribution to the crowd of client terminals 160. And, this selection can be made on a transmission by transmission basis. Therefore, the crown do client terminals 160 benefit by receiving the best available audio content during a communication comprised of plural discrete radio transmissions. In addition, the service provider 162 can make administrative decision about which content is shared and kept private and other dynamic control aspects.

Figure 9:
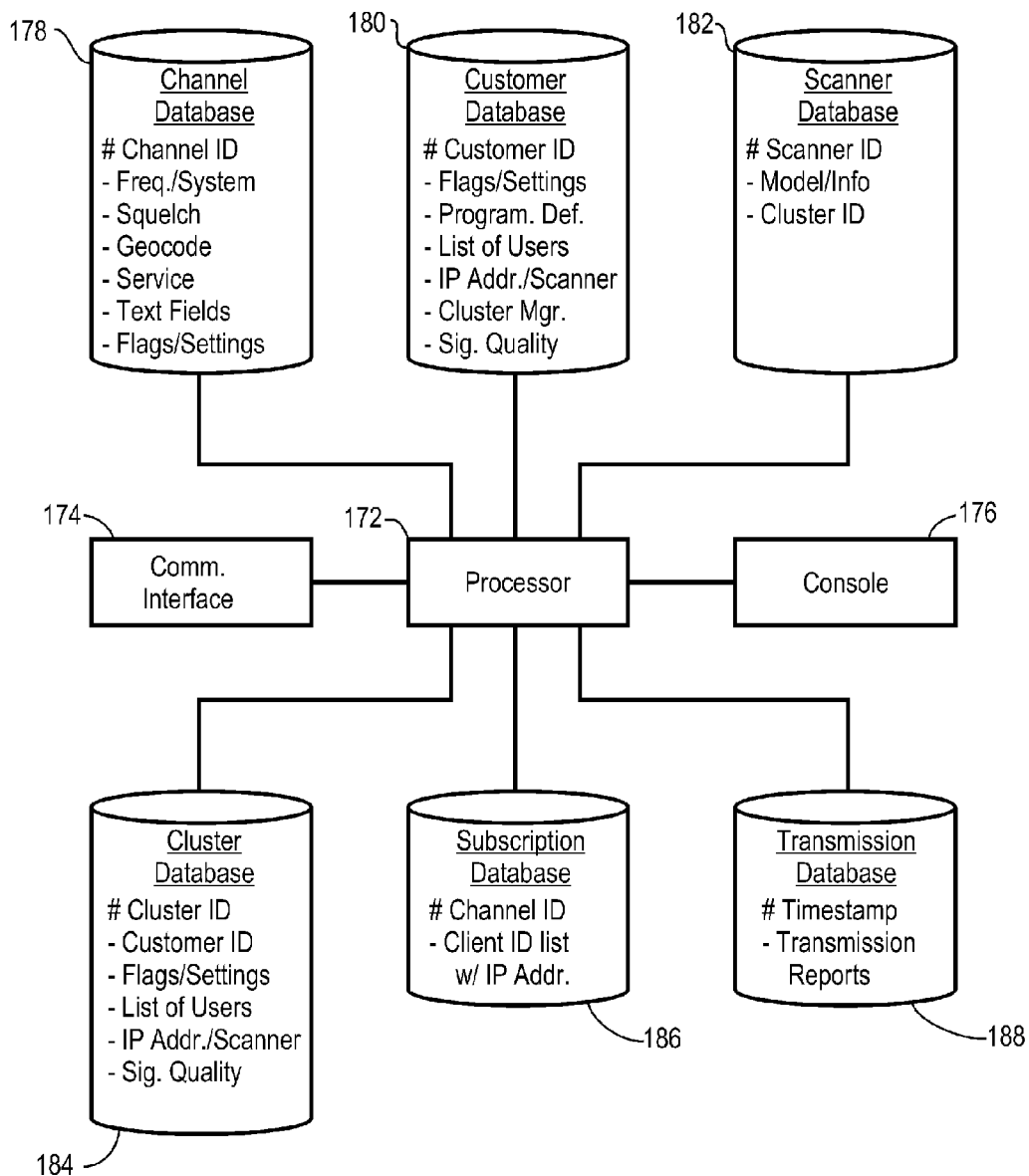
FIG. 9 is a service provider functional block diagram according to an illustrative embodiment of the present invention.

Reference is directed to FIG. 9, which is a service provider functional block diagram according to an illustrative embodiment of the present invention. As noted hereinbefore, a service provider implements a number of databases to track customers, radio channels, radio terminals, client terminals and other information. This requires a processing capability 172, and console interface 172 and a communications interface 174 with the host network. In the illustrative embodiment, cloud based database service, such as Amazon RDS service, can be utilized. Although, it is understood that the databases and processing capabilities could be otherwise provided. A customer database 180 is indexed by unique customer identifications, and contains pertinent customer data such as contact and billing information, a listing the authorized users, IP addressing, programming definitions, listing of clusters cluster managers for each customer, and other various flags and setting, and may include a signal quality factor that customers radio terminals. The service provider also provides a channel database 178. Ideally, the channel database 178 is a complete listing of every radio channel in the United States. As we discussed hereinbefore, this includes radio frequencies, squelch codes, talk groups, geographic location, service description, text fields, and certain flags and codes that will be discussed hereinafter. Note that each channel has a unique channel identity assigned by the system.

The databases maintained by the service provider also includes a scanner database 182, which is indexed by unique scanner identities and includes information on the radio terminal capabilities by manufacturer model, and also the terminal's cluster identification. Note that the term "scanner" may be used to describe a radio terminal in this disclosure, even thought the scanner circuits are just a portion of the overall capabilities of a radio terminal. The cluster database 184 is actually more significant than the scanner database in that the Multi-Sync concept is implemented by assigning all scanners to a cluster, even if there is just a single scanner in the clusters. Each cluster is assigned a unique cluster identification, which is an index for this database. Each cluster belongs to a customer ID, includes a list of users, and IP address for the cluster manager as well as for all the scanners in the cluster, and certain flags and settings, which will discussed hereinafter. In addition, each cluster can be assigned certain signal quality factors.

The service provider also implements a subscription database 186. This database correlates channel identities with client terminal identities, and represents an essential function of the system. This is the database which tracks which channels are assigned for transmission report forwarding to each client terminal. There is a process called the cascade server (discussed hereinafter), which calls on the subscription database to determines where each transmission report must be sent. Client terminals subscribe to a channel, and then the cascade server makes sure the transmission report for each channel are forwarded to the correct client terminals. This database also tracks the IP address of the client terminals for routing the transmission reports. In addition, this database also tracks channel/source subscriptions and channel/best subscriptions (discussed hereinafter). The service provider also implements a transmission database 188. Generally, the cascade server routes transmission reports to the subscribed terminals in near real time. However, the system also maintains this transmission database 188 for historical access purposes. This enables the system to deliver historical transmission reports where a client terminal seeks to replay 'action' that occurred at a prior point in time.

Figure 10:
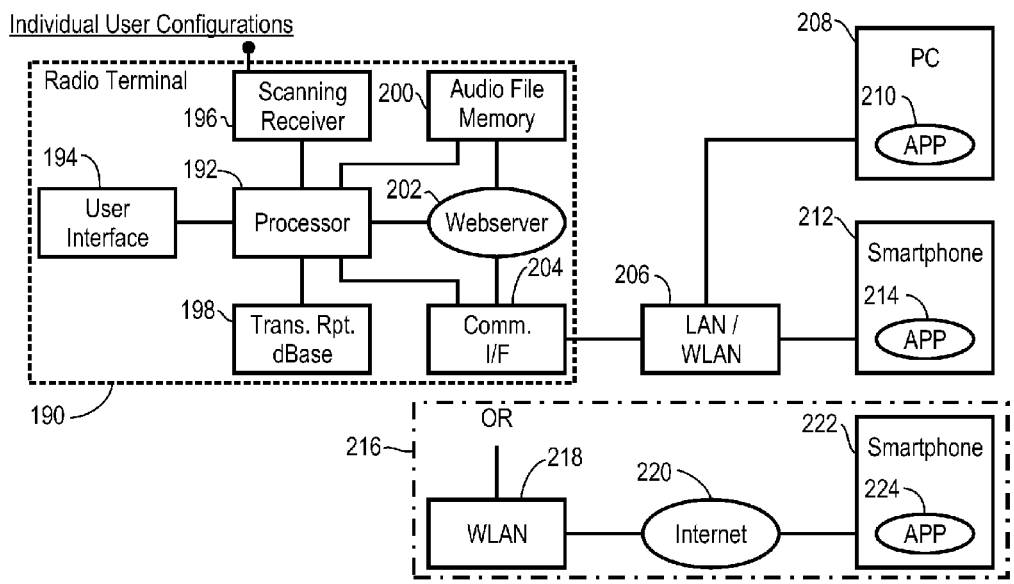
FIG. 10 is an individual scanner user functional block diagram according to an illustrative embodiment of the present invention.

Reference is directed to FIG. 10, which is a functional block diagram useful for an individual scanner user according to an illustrative embodiment of the present invention. The radio terminal 190 includes a multi-band scanning receiver 196 for sequentially scanning plural radio channels for discrete intermittent radio broadcasts under control of processor 192. A radio terminal user interface 194 is also controlled by the processor 192. As discrete broadcasts are captured by the scanning receiver 196, they are digitally recorded into audio file memory 200 at network addressable locations. A transmission report is generated for each discrete transmission, and is stored in a local transmission report database 198. In addition, each transmission report is forwarded to any locally coupled client terminals subscribed to receive them, such a personal computer 208 and smart phone 212 in the illustrative embodiment. A communications interface 204, such as an Ethernet interface, couples the processor 192 and a network file server function 202 to the WLAN 206.

It will be appreciated that popular local area network "LAN" routers or wireless local area routers "WLAN" 206, such as WiFi®, routers operate according to the TCP/IP family of protocols. This typically includes a local registration process wherein newly connected devices couple their MAC address to such router and the router responds by assigning a proxy IP address to the connected device. In this manner, the device is connected to and is addressable within the local area network by that proxy IP address. For example, if the WLAN base station 206 proxy IP address were 192.168.0.0, it might assign the radio terminal 190 a subordinate IP address of 192.168.0.105, and this would establish the local network address for the radio terminal 190. Any other devices connected to the WLAN 206 would also be assigned proxy IP addresses, and therefore all of the devices connected to the WLAN 206 would be enabled to communicate with one another using TCP/IP protocols, such as the http protocol.

The WLAN 206 enables the radio terminal 190 to communicate with the PC computer 208 and smart phone 212 according the proxy IP address, which are assigned by the WLAN router 206. Note that the PC computer 208 runs an application program 210, and the smart phone 212 runs an application program 214, which enable the functionality of the illustrative embodiment. Thus, the transmission reports generated in the radio terminal 190 are forward to the proxy IP address of the PC 208 and smart phone 212. Each transmission report includes an http/url network address of its corresponding audio file stored in the audio file memory 200. The PC 208 and smart phone 212 can then communicated a file request to the web server 202 for any audio file that is selected.

Now consider the addition connectivity box 216 in FIG. 10. Since the radio terminal 190 has a proxy IP address assigned by the WLAN, which is item 218 in this example, if the WLAN 218 is connected to the Internet 220, then the radio terminal 216 is also addressable on the Internet 220. This enables the user to access the radio terminal 190 from any web enabled device, such as the smart phone 222, provided that the device is running the requisite application program 224. Thus, the user is enabled to monitor the scanner 196 captured audio either locally through the WLAN or from any location on the Internet 220.

Figure 11:
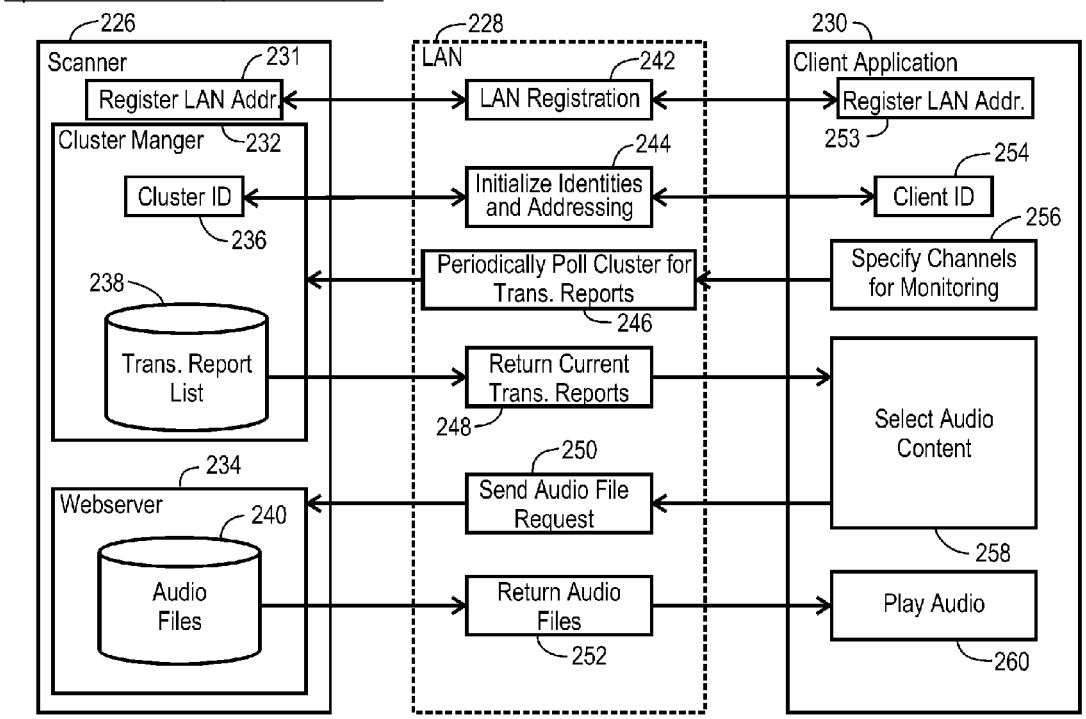
FIG. 11 is an individual user processing diagram according to an illustrative embodiment of the present invention.

Reference is directed to FIG. 11, which is an individual user processing diagram according to an illustrative embodiment of the present invention. This diagram generally comports with the functional block diagram or FIG. 10. In FIG. 11, the functions of the radio terminal 226, and LAN 228, and the client terminal 230 are represented. Operational activity generally progresses in a downward direction in the drawing figure. The radio terminal 226 registers a LAN address 231 with a LAN registration process 242, as was discussed above. Similarly, the client application program 230 registers the client terminal for a LAN address 253 with the LAN registration process 242. In this manner, both the radio terminal and client terminal obtain addresses and the ability to access other terminals on the LAN using LAN addresses. A cluster manager function 232 in the radio terminal and the client application in the client terminal exchange a cluster ID 236 and a client ID 254 through an initialization and addressing function 244 through the LAN, which establishes unique identities for these devices, and any other devices that might operate on the LAN.

The client application 230 specifies channels for monitoring 256. The client terminal periodically polls the cluster manger 246 requesting any new transmission reports for the selected channels. The cluster manager 232 recalls any new transmission reports from the transmission report list 238 and returns the current reports 248 to the client application 230. In this manner, the client terminal is made aware of new transmission reports on a near real-time basis. The contents of the transmission reports are examined by the client terminal application, and it selects desirable audio content 258, and sends corresponding audio file requests 250 to the web server 234 in the radio terminal. The web server 234 recalls the requested audio file from an audio file database, and returns the audio files 252 to the client application 230, which can then play the audio 260.

Figure 12:
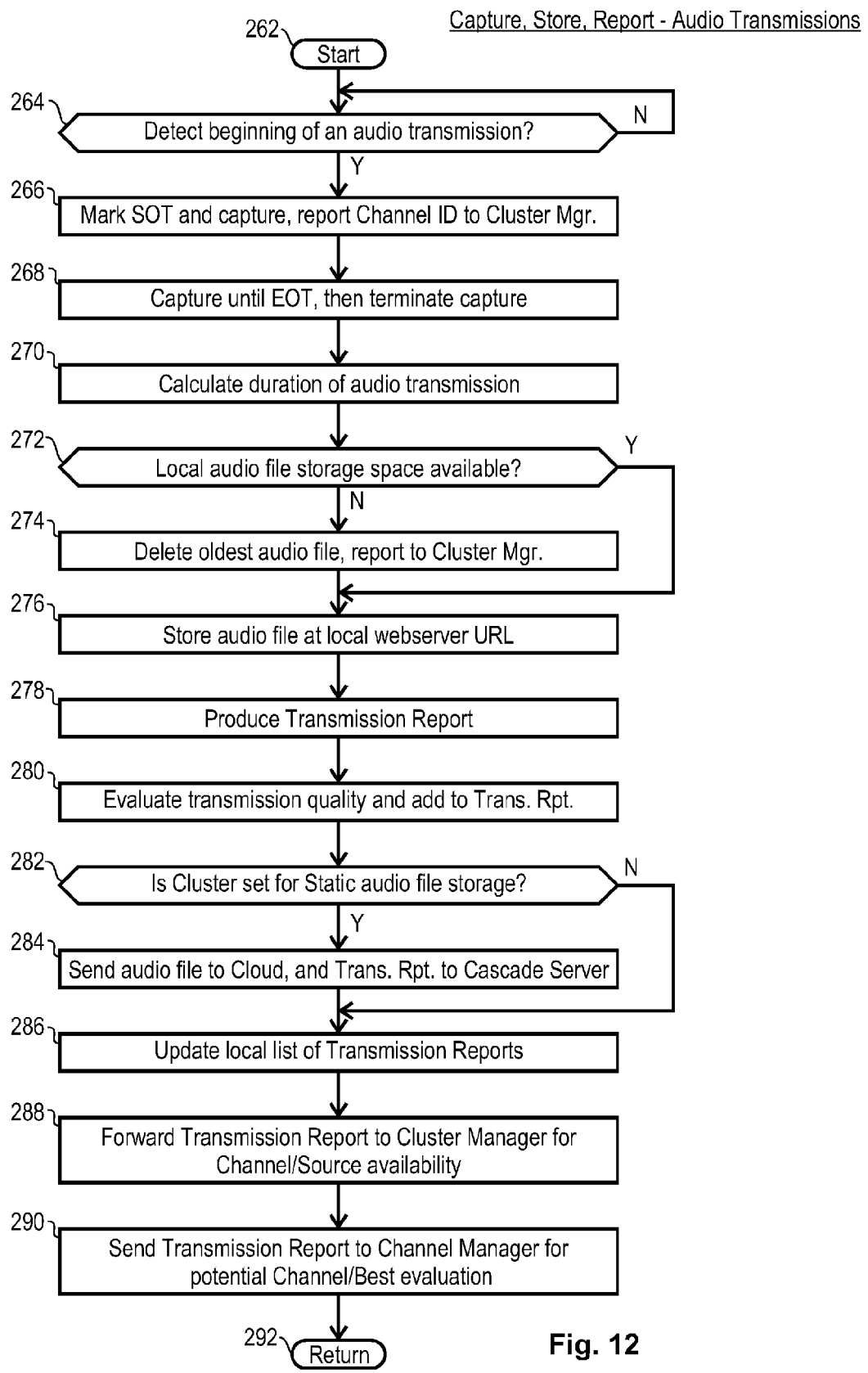
FIG. 12 is a process flow diagram for the capture and storage of audio signals according to an illustrative embodiment of the present invention.

Reference is directed to FIG. 12, which is a process flow diagram for the capture and storage of audio signals according to an illustrative embodiment of the present invention. The transmission reports generated in the illustrative embodiment include the unique identity of the channel being captured, and also the time of capture, as well as the network address at which the corresponding audio file is stored. These two data uniquely identify every discrete transmission and its corresponding audio file. Of course, each discrete transmission begins at a start of transmission (SOT) time and ends at an end of transmission (EOT), with the difference between them being the duration of the transmission. These times are determined by the radio terminal at the time each discrete transmission is captured. With this in mind, consider FIG. 12. The process begins at step 262 and proceeds to a loop at step 264 where the radio terminal detects the beginning of a new discrete radio transmission. If a transmission is detected, the SOT is marked and the capture and recording processes are commence immediately. The unique channel ID is reported to the cluster manager so that the Multi-Sync process and waive off any other radios in the cluster that detect the same transmission. At step 268, the capture and record processes continue until the EOT is detected, which terminates the processes. The duration of the transmission is calculated at step 270.

Since the audio file that has been recorded needs to be stored in the local, volatile, memory of the radio terminal, the available audio files space is checked at step 272. If there is insufficient space, the oldest content is deleted from the memory at step 274, and that deletion is reported to the cluster manager. On the other hand, at step 272, if there is sufficient memory, the newly recorded audio file is stored in the local memory, using a web server URL address, at step 276. At step 278, the radio terminal generates a transmission report that includes the channel ID, the transmission time information, the URL of the audio file, and other related information, which may include textural descriptors, squelch information, and so forth. At step 280, the radio terminal evaluates the quality of the signals that were captured, and adds this quality information to the transmission report. The nature of the quality information will be discussed hereinafter.

As was discussed hereinbefore, there is an option in the illustrative embodiments to store audio files in the volatile local memory, or upload them to a static memory located elsewhere in the network. At step 282, the radio terminal tests to determine if the cluster is marked for static storage. If it is, then the captured audio file is uploaded to the cloud server, and the transmission report is sent to a network based cascade server. Note that the audio file URL of that transmission report is updated to reflect the cloud server storage URL. At step 286, the locally stored list of transmission reports is updated to include the new transmission report, whether the audio file is stored locally or in the network. At step 288, the transmission report is forwarded to the cluster manager so that is can be made available for channel/source monitoring by client terminals on the network. At step 290, the transmission report is sent to a channel manager located on the network, which compares this transmission capture with other captures of the same discrete transmission so as to determine the best available copy. The process returns at step 292. Note that at the completion of the process, the transmission report has been sent to the cascade server, and channel manager, and the cluster manager. Also note that the transmission report includes the URL of the audio file, whether it is stored locally or on a network server.

Figure 13:
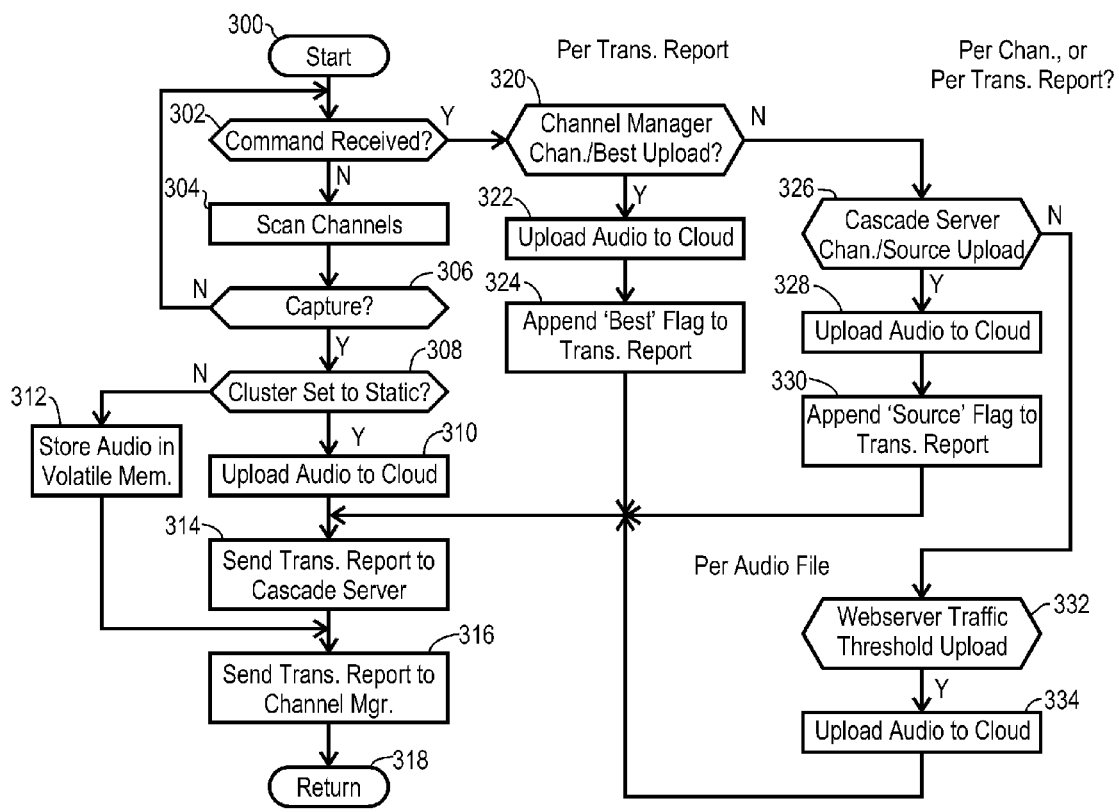
FIG. 13 is a process flow diagram for static and volatile audio storage according to an illustrative embodiment of the present invention.

Reference is directed to FIG. 13, which is a process flow diagram for static and volatile audio storage according to an illustrative embodiment of the present invention. As has been mentioned briefly, the illustrative embodiment provides for local audio file storage in the radio terminal, so called 'volatile' storage, or network served audio file storage, so called 'static' storage. FIG. 13 presents an illustrative process that changes a default volatile storage to a static storage operation.

In this example, there are four motives for making this transition. The first motive is simply that the cluster to which the radio terminal is attached has been administratively set for static storage. For example, a large enterprise user who desires to save all audio content in static storage. The second motive is when the channel manager, which designates some transmission as the best available copy, submits a command to the radio terminal that it upload a particular audio file to static storage. This is useful when a sequence of discrete transmissions is being saved, but the best available copy is preferred. The third motive is when the cascade server determines that there are a relatively large number of subscribers to a particular channel and the processing and network capabilities of a network server is preferred over the relatively limited capability of the radio terminal web server. In this case, the cascade server sends and upload command to the radio terminal. The fourth motive is when the radio terminal web server detects and unacceptably high level of audio file requests, which prompts it to upload an audio file to the network storage and web server.

Considering the sequence of steps in the process of FIG. 13, the process begins at step 300 and proceeds to step 302 to check in an upload command has been received. If not, the flow proceeds to step 304 where the scanning receiver scans for radio transmissions. If no signal is present at step 306, the process of checking for commands and signals repeats. If a signal is captured at step 306, then a test is made to determine if the cluster for this radio terminal is set to static. If it is not, then the audio file that has been captured is stored in the local volatile memory. On the other hand, of the cluster is set to static, then the captured audio file is uploaded to a cloud server for storage at step 310, and a transmission report indicating the URL of the cloud storage location is sent to the cascade server at step 314 so as to enable the cascade server to forward it to subscribed client terminals. Next at step 316, whether the cluster is static or volatile, the transmission report is sent to the channel manager so that the capture can be evaluated for channel/best consideration. The process then returns at step 318.

Returning to step 302 in FIG. 13, where the radio terminal checks to determine if an upload command has been received, if it has, then the process continues sequentially to step 320 to determine if the upload command is from the channel manager, and step 326 to determine if it is from the cascade server, and step 322 to determine of the local web server has issued the upload command. Each of these sources of upload commands receives a particular subsequent process. In the case of a channel manager upload command at step 320, the audio file is uploaded to a cloud based audio file storage and web server at step 322. A "best" flag is appended to the transmission report at step 324 so that subsequent processes can identify the related audio transmission as being the best available copy for the particular discrete radio broadcast. The process then continues to step 314, et seq. to forward this amended transmission report to the cascade server and channel manager. It is necessary to sent it to the channel manager so that the channel manager is aware of the new address at which the audio file is stored. If the upload command is received from the cascade server at step 326, then the radio terminal uploads the audio file to a cloud based audio file storage and web server at step 328, and then appends a "source" flag to the transmission report at step 330. The process then continues to step 314, et seq. to forward this amended transmission report to the cascade server and channel manager. If the upload command originals from the local web server at step 332, then the audio file is uploaded to a cloud based audio file storage and web server at step 322, and includes the URL of the web server storage location. The process then continues to step 314, et seq. to forward this amended transmission report to the cascade server and channel manager. Note that in every case, the cascade server and channel manager receive a transmission report with the current storage location URL of the corresponding audio file, and that the transmission report will be flagged as to the purpose of its upload.

Figure 14:
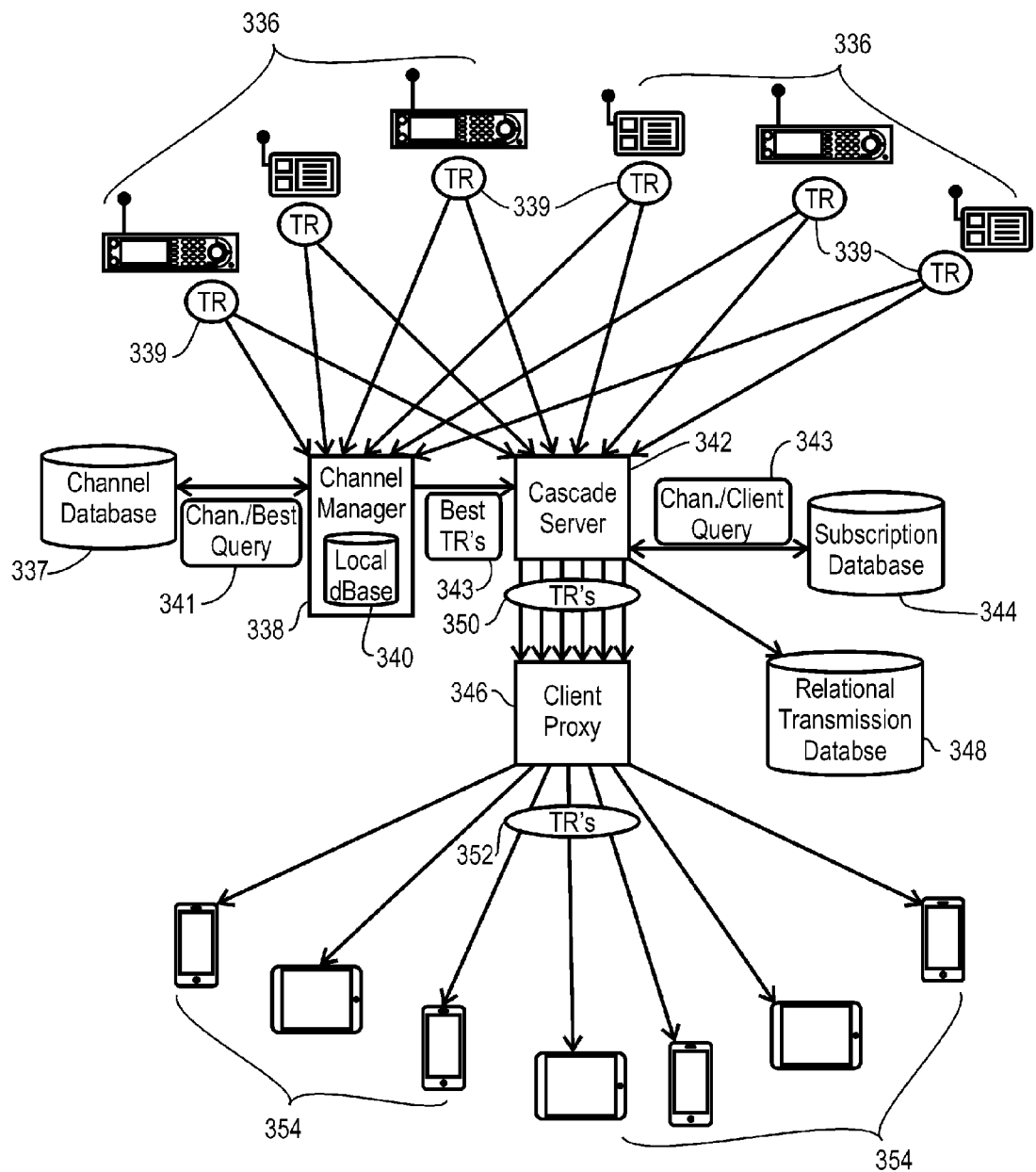
FIG. 14 is a transmission report distribution functional block diagram according to an illustrative embodiment of the present invention.

Reference is directed to FIG. 14, which is a transmission report distribution functional block diagram according to an illustrative embodiment of the present invention. This figure illustrates more clearly the movement of transmission reports from the plural radio terminals 336 to the plural client terminals 354. As the plural radio terminals 336 capture intermittent radio broadcasts from time to time, a transmission report is generated for each, and the transmission reports 339 are forwarded through the network to the cascade server 342 and to the channel manager 338. The function of the cascade server is to forward transmission reports to the client terminals that have subscribed to receive them according to the channel identity, and possible also the source, of the captured audio. To accomplish this function, the cascade server 342 queries 343 a subscription database 344 with the channel ID of each transmission report, and the subscription database returns a list of the client terminal identities that have subscribed. The cascade server 342 then forwards the targeted transmission reports 350 to a client proxy server 346. The client proxy server 346 serves as an intermediary to isolate the cascade server from the network delivery mechanism to the client terminals 354. Note that in addition to determining which client terminals are to receive transmission reports, the cascade server 342 also forwards a copy of each transmission report to a relational database 348, which enables historical queries of transmission reports by other terminals and user of the system.

The client proxy 346 delivers transmission reports 352 using two basic techniques. The first technique is to open a socket connection between the client proxy and a client terminal 354, and then stream the corresponding transmission reports 352 as they occur from time to time. This is referred to as a "push" type delivery system because the cascade server pushes the transmission reports 352 to the client terminals 354. Of course, this technique requires a reliable open Internet connection. The second technique for delivering transmission reports 352 is for the cascade server to briefly buffer the transmission reports and await an inquiry from the corresponding client terminals. The client terminals 354 make repetitive requests to the cascade server 346 and any newly arriving transmission reports 352 in relatively short windows of time. This is referred to as a "pull" type delivery system. For either delivery system, the latency can be quite low, and provides the client terminal user with a near real-time delivery of activity on the source radio channels.

The transmission reports 339 from the radio terminals 336 in FIG. 14 are also delivered to the channel manager 338, which stores them in a local database 340. The channel manager 338 has access to the channel database 337, which provides information about all the channels in the system, including which channels are designated for channel/best monitoring 341. In channel/best monitoring, client terminals are subscribed to radio channels without indicating a preferred source from which they are received. Rather, the client terminals have designated that the best available copy of each transmission be reported. The channel manager 338 selects the best available transmission capture by collecting all the transmission reports for a discrete radio transmission in its local database 340 over a window of time, and then selects the best copy according to quality factors in the transmission reports and well as other administrative factors, and then delivers the selected best transmission reports 343 to the cascade server 342, which then distributes them to the channel/best subscribed client terminals 354.

Figure 15:
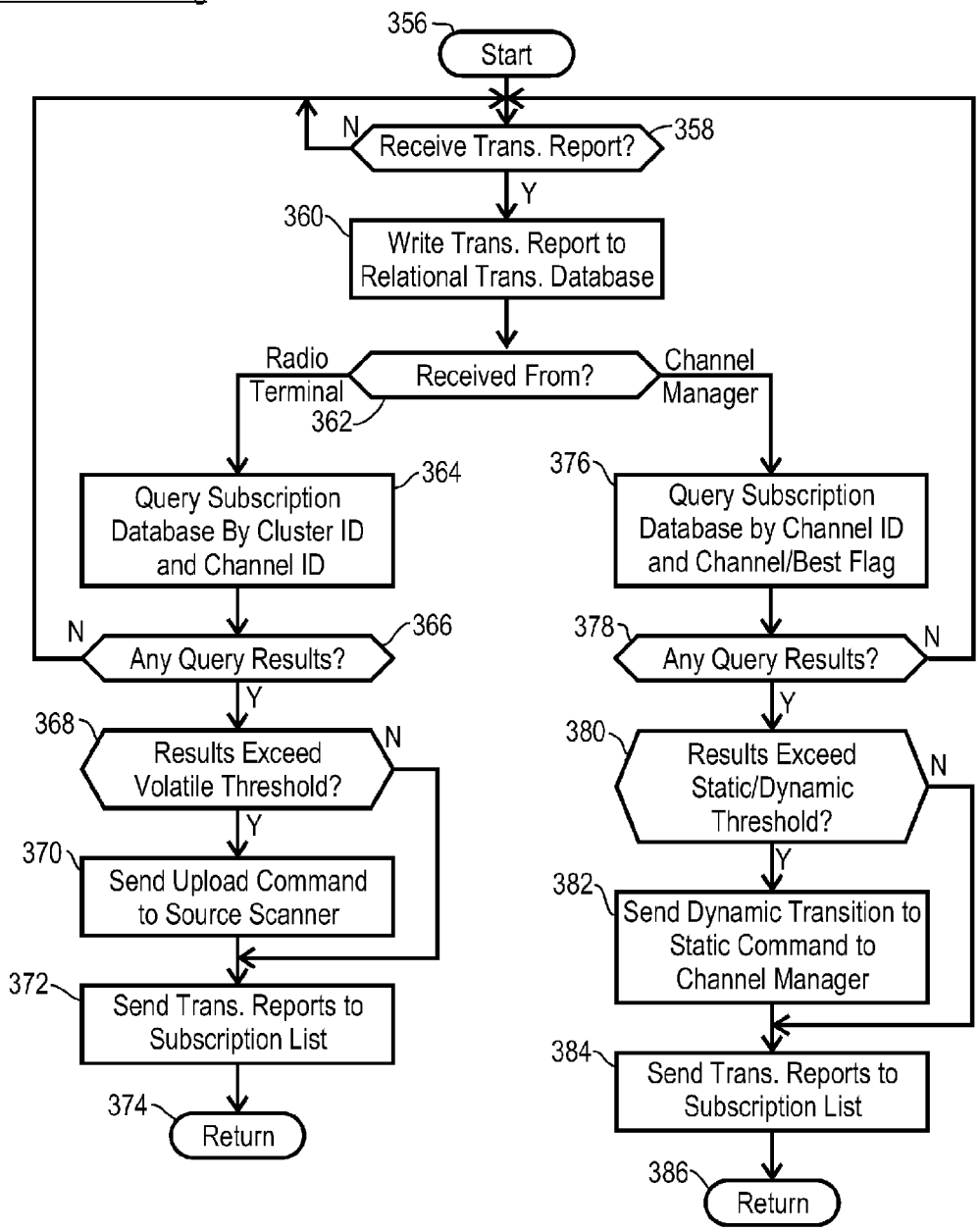
FIG. 15 is a cascade server process flow diagram according to an illustrative embodiment of the present invention.

Reference is directed to FIG. 15, which is a cascade server process flow diagram according to an illustrative embodiment of the present invention. As was discussed hereinbefore, the cascade server's function is to deliver transmission reports to client terminals that have subscribed to receive them, whether they are channel/source designated subscriptions or channel/best designated descriptions. Note that the cascade server receives channel/source transmission reports from the radio terminals, and channel/best transmission reports from the channel manager. The process of FIG. 15 begins at step 356 and proceeds to step 358 to test if a transmission report has been received. If a transmission report has been received, the cascade server writes that transmission report to the relational transmission report database at step 360 so that it is available for historical queries, and other purposes. At step 362, the cascade server then tests where the transmission report came from. If it came from a radio terminal, then the process proceeds to step 364 where the cascade server queries the subscription database using the cluster ID and channel ID of the transmission report to get a list of client terminal identities that have subscribed on a channel/source basis to received this transmission report. Note that the cluster ID indicates the source, and the channel ID indicates the radio channel.

At step 366, the cascade server tests to determine is the database query returned any results. If not, the process returns and no distribution of the transmission report are made. If the query does produce results, then the process goes to step 368 to determine if the number of subscribed client terminals exceeds a threshold that is acceptable for volatile memory storage and distribution. Volatile storage is in the source radio terminal, which also provides the web server function for the corresponding audio file. If the number of subscribed client terminals is too large, then the cascade server sends an upload command to the source radio terminal at step 370. The cascade server then sends the transmission report to the list of subscribed client terminals at step 372. On the other hand, at step 368, if the list of subscribed client terminals is not too large, then process goes to step 372 where the transmission report is forwarded to the subscribed client terminals. The process then returns at step 374.

At step 362 in FIG. 15, if the transmission report is received from the channel manager, then the process continues to step 376. At step 376, the cascade server queries the subscription database by channel ID and channel/best flag set to true, to located any client terminals that have subscribed to the present channel for channel/best service. If there are no results at step 378, the process returns. If there are results at step 378, the process continues to step 378, where the cascade server tests to determine if the number of results exceeds a static/dynamic threshold. If the number of channel/best subscribers exceeds the threshold, then the cascade server sends a dynamic transition to static storage of audio files command to the channel manager for the present unique channel ID. The purpose of this command is to cause the channel manager to submit upload to static storage commands to radio terminals that are subsequently selected as the best channel for the current channel ID. The cascade server cannot do this directly because it is unknown which source radio terminals might be selected as channel/best in future transmission captures. It has to be done dynamically by the channel manager on a transmission by transmission basis. At step 384, the present transmission report is distributed to all the radio terminals that have subscribed the present channel/best capture, and the process returns at step 386.

Figure 16:
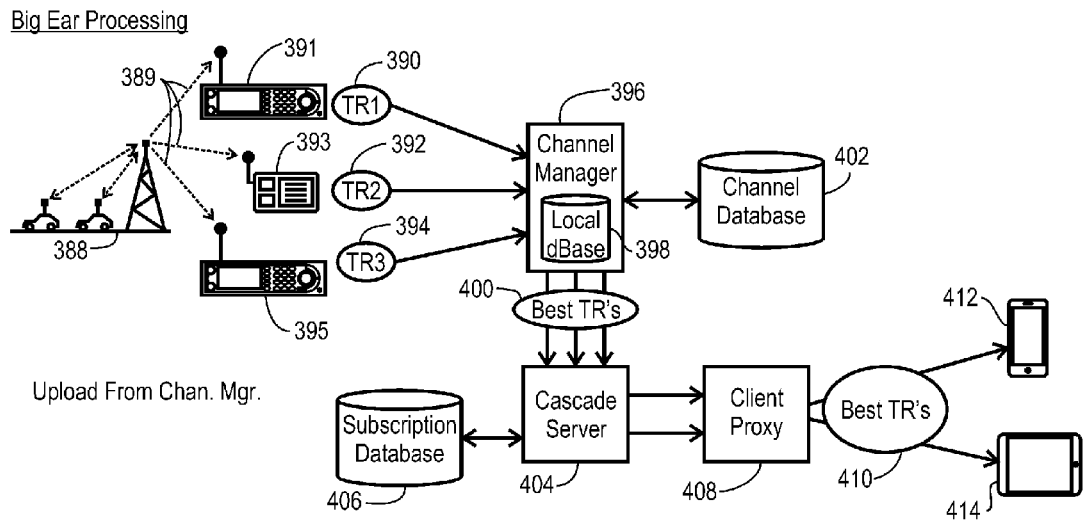
FIG. 16 is a crowd sourced best transmission functional block diagram according to an illustrative embodiment of the present invention.

Reference is directed to FIG. 16, which is a crowd sourced channel/best transmission functional block diagram according to an illustrative embodiment of the present invention. As was discussed hereinbefore, channel/best channel subscription is used by client terminals to receive the best audio recording of intermittent discrete radio transmissions for a unique channel identity, regardless of which radio terminal was the actual source of the audio file and corresponding transmission report. This service is delivered to client terminals using the network based channel manager function together with certain other databases and servers in the illustrative embodiment. FIG. 16 illustrates how three radio terminals, which are members of respective radio clusters submit three transmission reports 390, 391, 394 for the same discrete radio transmission of a land mobile radio system 388. And, how the best corresponding audio recording is designated by selecting the best transmission report and sending that to the subscribed client terminals 412, 414.

A land mobile radio system 388 transmits a discrete radio transmission 389 amongst a series of intermittent radio transmission, all containing audio content, that is received by three radio terminals 391, 393, 395. All three of the radio terminals capture and record the transmission 389, and send corresponding transmission reports 390, 392, 394 to the channel manager 396, as well as the cascade server 404. The channel manager holds the three transmission reports in a local database 398 for a delay time long enough to address any capture and latency times so as to ensure all three transmission reports 390, 392, 394 are available in the local database 398 before any comparison is attempted. The channel manage 396 also queries the channel database 402 to determine which channels are set for channel/best service, and certain other information discussed hereinafter. Once the delay time has passed, the channel manager 396 compares all the transmission reports for a discrete radio transmission, which are identified by the unique channel ID and the time of transmission. Using certain quality factors with the transmission reports, and certain administrative information, the channel manager 396 selects the best transmission report 400 and sends it (them) to the cascade server. This enables the cascade server to forward the transmission report(s) to the client terminals 412, 414, which have subscribed for channel/best service on this channel ID. Note that the cascade server determines the subscribed client terminals by querying the subscription database. Also note that the cascade server 404 uses a client proxy server 408 to distribute the best transmission reports 410, as was described hereinbefore. The client terminals 412, 414 are thusly enabled to request the corresponding best audio file(s) from the radio terminal at which each is stored.

The comparison of transmission reports by the channel manager can apply several factors in determining the best. Since not all radio terminals will discover a discrete radio transmission at the same moment, or may otherwise be occupied, factors to consider are the duration of the recording, and the start of transmission SOT time. Generally, the longer recordings are better, as are the recordings that start earlier. Signal to strength factors may be added by the capturing radio terminals, which is a useful factor. The capturing radio terminals can also conduct signal level testing on the captured audio file to establish a quality fact that is added to the transmission report. Radio 'birdies', which characterize intermodulation distortion, and other mixing and propagation factors can also be added by the capturing radio terminals. There can be administrative factors added by the capturing radio terminal, the channel database, and the channel manager which deem some radio terminals as being of particularly good quality and reliability.

Figure 17:
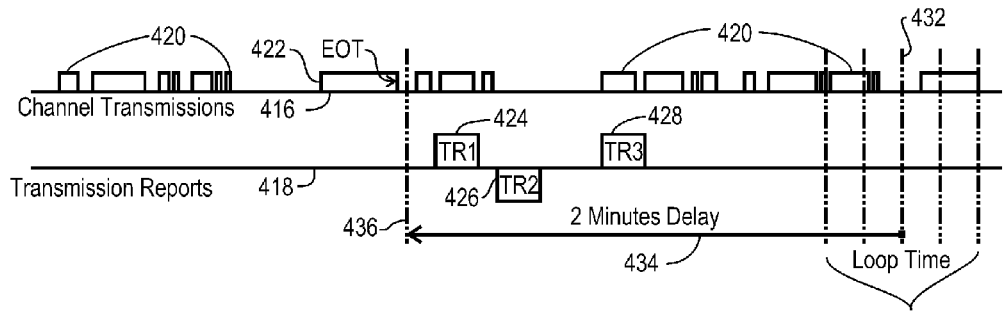
FIG. 17 is a crowd sourced best transmission timing diagram according to an illustrative embodiment of the present invention.

Reference is directed to FIG. 17, which is a crowd sourced channel/best transmission timing diagram according to an illustrative embodiment of the present invention. This timing diagram generally comports with the example given in FIG. 16. In FIG. 17, a first timing line 416 display a sequence of discrete intermittent radio system broadcasts 420 over a period of time, which are subject to capture by the radio terminals of the illustrative embodiment, illustrated in FIG. 16. Note the one particular radio transmission, 422, will be discusses in this timing example. As the sequence of radio transmissions 420 occur over time, the plural radio terminals scan, receive, and capture them, and also generate corresponding transmission reports. For the exemplary transmission 422, the three radio terminals generate three transmission reports 424, 426, 428, reference as TR1, TR2, and TR3 from FIG. 16. Notice that these transmission reports occur over time along timing line 418. As transmission 422 is captured, there is some latency in the radio terminals' transmission report generation process as well as network latency in these reports reaching the channel manager. This explains the illustrated delay in FIG. 17. The channel manager frequently samples its local database according to a repetitive loop time 430, which may be every 100 milliseconds, for example. At each loop time 432, the channel manager looks for transmission reports that have an EOT time that occurred earlier than the loop time minus a delay time 434. In this example, the delay time is 2 minutes, for example, and the loop time event 432 is the reference, which looks back to see that the EOT of the exemplary transmission 422 occurred earlier in time than the loop time 432 minus the delay time 434. Note that the channel manager is actually looking at the time values in the transmission reports 424, 426, 428, and not the physical transmission of the radio signal 422. Therefore, the channel manager identifies the three transmission reports 424, 426, 428 as having the same channel ID and overlapping timing, which occurred prior to the delay line indicated by line 436. These three transmission reports are thus compared for the channel/best process to identify the best of the three.

Figure 18:
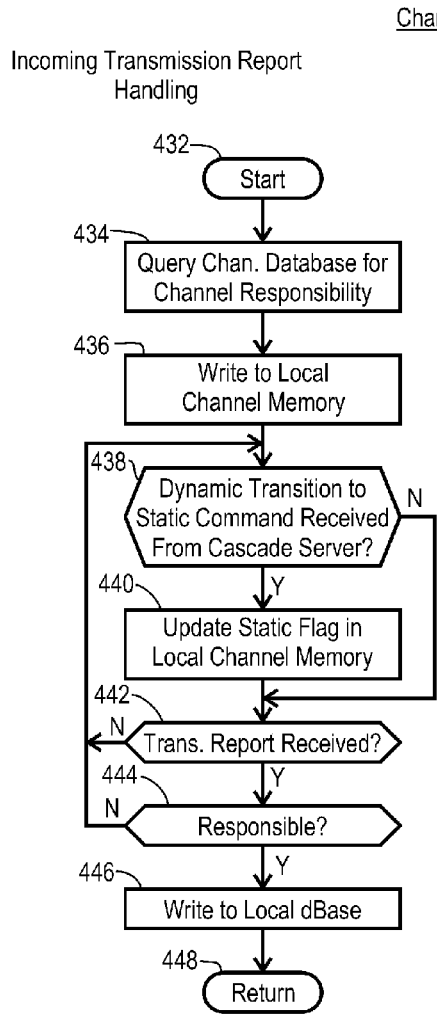
FIG. 18 is a process flow diagram for channel manager incoming transmission report handling according to an illustrative embodiment of the present invention.
Figure 19:
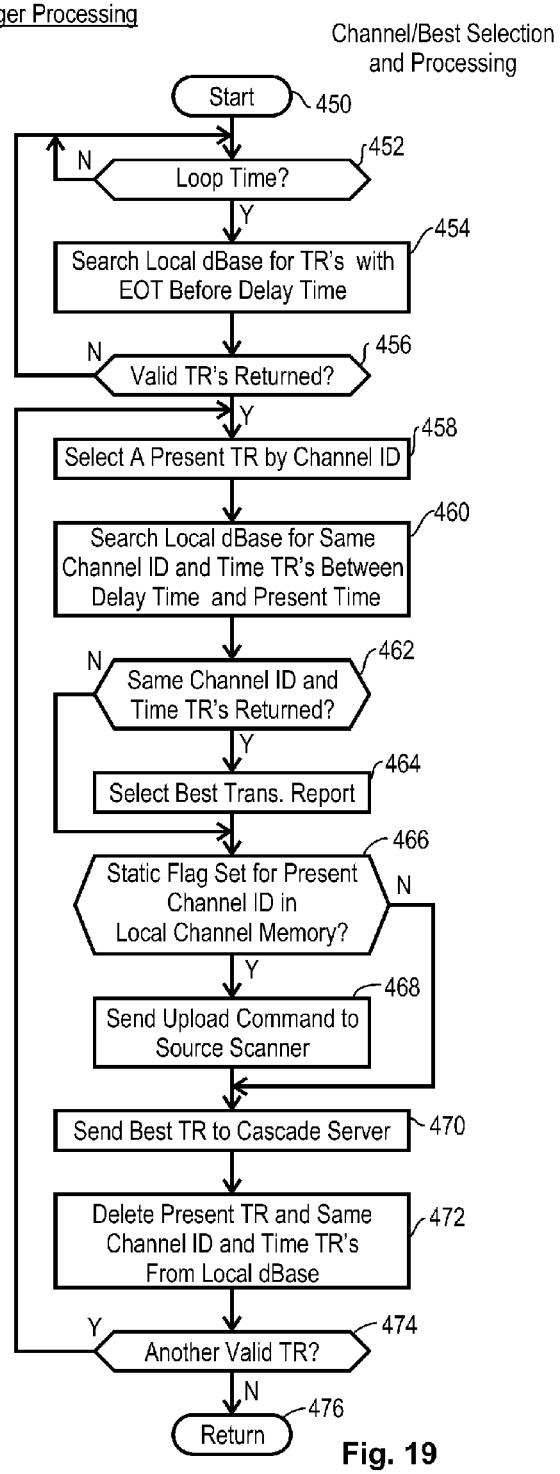
FIG. 19 is a channel manager processing flow diagram according to an illustrative embodiment of the present invention.

Reference is directed to FIG. 18 and FIG. 19, which are process flow diagrams for the channel manager operation according to an illustrative embodiment of the present invention. As has been discussed hereinbefore, the channel manager function is primarily to monitor the transmission reports from plural radio terminals on a discrete radio transmission by discrete radio transmission basis, and then select the best available audio recording based on the content of those plural transmission reports, and then forward the channel/best pick for distribution to the several client terminals that are subscribed for channel/best reception of unique channel identities. The channel manager actions are presented in two flow charts. FIG. 18 illustrates the incoming transmission report handling procedure, and FIG. 19 illustrates the channel/best selection process.

The incoming transmission report processing of FIG. 18 begins at step 432 and proceeds to step 434 where the channel manger queries the channel database for any channels that are flagged for channel/best processing, and therefore fall under the responsibility of the channel manager. At step 436, the query results are written to the local memory for inclusion of each channel ID as one that is subject to channel/best monitoring. At step 438, the channel manager tests to determine if there has been a command from the cascade server to make a dynamic transition to static storage for any of the monitored channel ID's. If there has been, then the static flag for that channel is added to the local channel memory at step 440, which effects the transition to static storage for future captures on that unique channel ID. Flow then proceeds to step 442. At step 442, the channel manager test to determine if a transmission report has been received. IF not, flow returns to step 438. If a transmission report has been received, then flow proceeds to step 44, where the channel manager checks the local channel memory to determine if it is responsible for channel best monitoring on the instant transmission report. In not, the report is ignored and flow returns to step 438. If the channel manager is responsible, then the transmission report is written to the local transmission report database, which places it in the queue for channel/best monitoring. Flow returns at step 448.

Having established which channel ID's the channel manager is responsible for, and having begun populating the local transmission report database with recent transmission reports, the channel manager proceeds with the channel best selection processes of FIG. 19. The process begins at step 450 and proceeds to step 452 where the loop timer runs. The loop time sets the frequency at which the channel manager looks back in time for the delay time period. In this embodiment, the loop time is 100 milliseconds and the delay time is two minutes. If the loop timer has run at step 452, the channel manager searches the local transmission report database at step 454 for transmission reports of audio files that have an EOT time earlier than the delay time. In other words, transmissions that were completed more than two minutes earlier in time. If no valid transmission reports are returned at step 456, the loop runs again at step 452. If there are valid transmission reports returned, then the channel manager selects a present transmission report according to its unique channel identity at step 458, and searches the local transmission report database for any other transmission reports that have the same unique channel identity that were originally broadcast at the same time within the delay time period. At step 462, the process checks to see if there are any other sources that captured the same channel ID at the same time. It then selects the best among these at step 464, based on the aforementioned quality criteria. If there were no other transmission reports at step 462, the flow proceeds to step 466 as well.

At step 466, the channel manager checks to determine if the static storage flag for the channel ID of the presently selected transmission report is set in the local channel memory. If it is set for static, then the channel manager sends an upload command to the source scanner at step 468. This action causes the source scanner to upload the audio file to static storage and generate a new transmission report, which is sent to the cascade server for distribution. Next, the channel manager sends the best transmission report to the cascade server at step 470. This completes that process of selecting and advising the best audio file according to transmission report information. The process then goes to step 472, where the channel manager deletes the present transmission reports from the transmission report database, since they have already been processed. At step 474, the channel manger check for any other valid transmission reports in the current delay period from processing back to step 458. In there are none, then the process returns at step 476.

Having a structured review of certain illustrative embodiments, it is worthwhile to consider other illustrative implementations useful given the current state of technology with consideration of evolving technology and network scalability. In certain embodiments, the media player portion of the client terminal APP is written in HTML5. However, since the JavaScript and JQuery environments function well with AJAX, which employs the pull method of transmission report distribution, the current cascade server system was developed with the expectation of a production cascade server system that operates as a database, which could employ standardized cloud services for facilitating scalability to large numbers of users. This urged initial development to a server-side structure, particularly as to where and how transmission reports are stored, since that is what the HTML5 player can be designed to use as a source. Therefore, the HTML5 media player features can be developed in the context of a player environment that knows everything it may need to know about the available transmission reports.

It is expected that the client terminals will most likely comprise a smart phone, tablet or other web-connected wireless device running an APP, with a user friendly graphical user interface having high resolution graphics and touch screen input capability. Other system architecture elements include the radio terminal with a radio scanner, account databases, transmission databases, network connections, proxy servers, and other elements. In particular, the channel/best process, which is also referred to as a "big ear" crowd based listening and content selection process, is a significant concept where the system gathers every available transmission received nationally and puts the best available copy for each transmission into a database that gives network access to those best copies. This could even be based solely on scanning hobbyist's incidental use of their scanners, provided they were web-connected. An outline of the operation of the channel/best big ear system includes:

Each radio terminal receives transmissions and stores them in a local buffer.

Each radio terminal notifies a server based channel manager with a transmission report.

The channel manager selects the best available copy of each transmission.

The best copy is selected based upon start and stop times, and signal strength.

Report of best copy is injected into the transmission database.

If there are a large number (threshold) of listeners, the source radio terminal is instructed to upload the audio file from the selected copy into a cloud-computing based audio file database.

The URL for the audio content can be either the cloud address or the radio terminal's address.

There is other structure around this outline, such as how user accounts are verified, how the system keeps track of how heavily monitored a channel is, how proxy servers are configured to allow remote access to radio terminals that reside behind firewalls, and so forth. The benefits of the foregoing illustrative embodiment are seamless integration so that users can listen to there own scanner at low-cost because the radio terminal provides the user's own content, with no writing to cloud services when there is just a single listener. There is no dependence on the reliability of any particular radio terminal feed site. If one scanner site goes offline, as long as someone else is monitoring the same channel, it will still be recorded with no apparent change in functionality. The system also provides the ability to make use of hobbyist scanners that are not dedicated to the purpose, in contrast to Multi-Sync-enabled scanners where there is a block of receivers linked in how they receive traffic, making them less useful for direct listening via the speaker. The big ear concept advantageously utilizes the availability of a large number of scanners unwittingly contributing content to the cloud servers.

Another aspect of the illustrative embodiments is that some channels of interest to professional users may be marked for storage on a server for the longer audio retention possible there. It is probable that audio file storage in the radio terminal will be shorter due to memory constraints. Also, audio stored in the radio terminal is inherently less reliable since it would vanish from the network if the source radio terminal is turned off. But for channels where only a few people are listening, and mostly near real-time, this is not necessarily a significant concern.

One design principle of the illustrative embodiment networked system is the desire to push as much processing and functional load onto the radio terminals since this lends itself to distributed processing and scalability without loading the external network. In the big ear model, the number of active feed sites is potentially enormous, but much of the content will be unused by anyone except the scanning radio terminal's owner. Routing all of this content through the cloud could be disadvantageous for both cost and scalability, but since the number of scanners scale naturally with the size of the network, core functionality that is embedded into the scanner hardware doesn't present these concerns. Further, what the scanner can do natively would be available to a customer in a LAN-only mode, with no Internet access, (no internet access), supporting future expansion for applications using this mode of operation. Therefore, the scanning radio terminal is tasked with the essential audio file server functionality, at a bare-bones level, needed to support a very small number of listeners using its own recorded audio content.

Another design principle of the illustrative embodiment is to avoid information flow bottlenecks by choosing fractionalization design options for scalability over concentrated mechanisms. The simplest designs would bring all content, including transmission reports, into a central process or database, and serve all client terminals from this resource. For example, transmission reports could be inserted into an SQL database, and client terminals would poll the database frequently for a list of new transmissions on channels of interest. However, this can lead to throughput limitations, especially due to the potential query pace from near real-time distribution of new content on each user's independently selected assortment of channels. Therefore, whenever possible, the design creates a routing system that avoids concentration of all data or queries through specific processes or data pipes.

The illustrative embodiment employs the use of clusters of radio terminals. This is a group of scanners combined for coordinated reception using the Multi-Sync technology, typically have common customer number and identical programming. A single radio terminal can be considered a cluster of one. Each cluster has a unique Cluster-ID. A cluster is scanners is generally co-located. In the past, a scanner was usually operated as a singleton, with one receiver with unique programming, with the user listening to speaker audio. However, in the illustrative embodiment, when using client terminal to listen to captured audio, there is a useful mode of operation involving multiple scanners co-operatively sharing a scan list. This is due to the illustrative embodiment's ability, when two or more transmissions are received at the same time on different scanners, to buffer audio and play the signals sequentially. To support this mode of operation, the Multi-Sync technology is used, and referred to as a group of co-operative scanners as a cluster. In principle, a singleton scanner is equivalent to a cluster with only one scanner, so instead of designing two modes of operation, the cluster model is employed in basic operations.

In the illustrative embodiment, a channel represents a single broadcast channel in a specific frequency, or group of frequencies, including any squelch control information, including squelch tones, digital squelch codes and trucked talk group identities. It also conveys some information about the group or groups of users who communicate on that channel, such as "Brookline Police Channel 1", etc. A channel/source is a copy of a channel originating at a particular co-located radio cluster, which is typically a single radio terminal. Some users will want to monitor the signals captured by a particular scanner, usually their own, but sometimes a friend's scanner, or a professionally established scanner with extraordinary quality. Again, note that "scanner" and "radio terminal" are sometimes used interchangeably. These users will use a mode of reception called referred to as "Channel/Source", which means receiving the copy of each transmission on a channel as captured by specific equipment. This concept may seem self-evident, but since the illustrative embodiment makes it possible to monitor other user's receivers, it may be important to identify the particular radio terminal of a channel signal that you want to receive. Radio terminal equipment is identified by Cluster ID, since that is the finest-grain meaningful for multi-scanner clusters, and hence more universal than a scanner ID. This mode of operation would be used primarily by hobbyists operating in a restricted mode to their own scanner's content, or professional users who supply and maintain dedicated hardware that is more trusted and reliable than the automatic channel/best best available selection system, or users who need minimum latency. This is because the channel/best selection process must wait for all reports to be available before selecting, imposing a slight delay.

In the illustrative embodiment, the channel/best mode of transmission report and audio file selection employs a copy of a channel composed of the best recordings of each transmission on system wide basis. In a community, multiple scanners may receive the same transmission. When this happens, the illustrative embodiment identifies the best copy of the transmission, and distribute it to client terminals monitoring that channel. Client terminals receiving transmissions in this way are using a mode of reception called "Channel/Best", and are this receiving the best available copy of each transmission on a channel, regardless of which particular radio terminal happened to record the signal. Note that this selection is done on a transmission by transmission basis, the system does not rely on a particular receiver identified as the one with best signal. The particular radio terminal selected will change from transmission to transmission, since any singleton scanner may miss some transmissions. For example, while receiving some other channel for its user, a particular radio terminal may miss one transmission in a series of transmissions. Although there is no guarantee that any particular radio terminal will catch the signal, when many radio terminal owners are independently scanning a channel, it is probable that each transmission will have been captured by some scanner in the system. The Channel/Best mode is a composite assembled from the best available recordings of each individual transmission on the broadcast channel, the product of many independently operated receivers and post-recording selection of the best audio. This mode of operation would be used by members of the public who don't have scanners, and by hobbyists or professional users who want to tap into the Big Ear pool of content made available through the illustrative embodiment crowd sourced radio terminal feed site network.

In the illustrative embodiment, "volatile" storage is when radio channel audio files are delivered from source radio terminals, have a limited history, and may vanish if the radio terminal is turned off. In the Big Ear embodiment, most transmissions are only of interest to a few customers, and only for a short time, typically under one hour. Furthermore, if more than one user has a scanner receiving a channel, many recordings may duplicate each other. There is no need to store all this audio in the cloud, if the file can be served by the scanner's network connection directly to client terminals on request. Unless there is a specific reason to retain data for an extended time, this is a more efficient way to operate the system, and takes advantage of the natural scalability of the scanner network. Note that the networking load on the scanner may be similar to uploading data to the cloud because a cloud upload requires one audio file transfer per reception, and, in the basic case when there is only one listener, responding to a file request from a single user requires exactly the same rate of audio file transfers. The threshold for maximum number of listeners in volatile storage mode, before content is routed through the cloud, can be set based on the radio terminal's web server performance capacity. Note that a disadvantage of volatile mode is that the audio will be unavailable if the radio terminal is turned off, or disconnected from the network, but since the value of low interest channels declines within a few minutes, the risk of significant content becoming unavailable is relatively small.

In the illustrative embodiment, static mode is when audio content stored on a cloud server for an extended period of time (i.e. static memory). Channel audio recordings may be preserved on Amazon.com's AWS S3 server. This extended history mode of storage does not depend on the radio terminals remaining active on the network. When there is significant interest in content, indicated by number of client terminals listening, a general rating or value of a channel, or channels designated professional use, that content will be stored in the cloud at Amazon's S3 server. The primary cost driver for cloud storage is the number of file uploads, data retention is relatively inexpensive, so static content can be preserved for an extended time, for example 30-90 days. When Channel/Best is designated for static coverage, new audio files are not stored immediately to the cloud, this is only done if the illustrative embodiment system determines that the radio terminal's particular copy of a transmission is the best available. In contrast, when a Channel/Source listening is designated for static coverage, new audio files are stored unconditionally. Since it is presumed that anonymous users do not use Channel/Source mode, Channel/Best is preferred for public distribution, and an entire radio terminal feed source is probably used for a single integrated purpose, for simplicity static designation for a source is applied at the level of the cluster instead of the channel. That is, a professional or high-quality cluster may be designated to store all audio in the cloud.

In the illustrative embodiment, a "bundle" is a group of channels that are co-distributed. When a client terminal specifies a list of channels on which transmission reports are desired, it may be burdensome, both in definition, and in database transactions, to explicitly cite each channel. To simplify this process, a group of channels may be administratively grouped into a bundle which can be subscribed to as a unit, that is, all channels within a bundle are reported.

The systems of the illustrative embodiment are implemented using several database structures that serve as repositories for essential system, user and terminal information, but also interrelate to embody the functionality of the illustrative embodiments. These databases are generally hosted on network servers, which may be cloud computing servers. However, those skilled in the art will appreciate that the database structures could also be scaled for private network use and operation, and even executed on a single processing unit if needed.

A central channel database is useful as a resource for programming of radio terminals and radio scanners, and also a place to annotate channels for certain advanced features of the illustrative embodiment. The channel database uses a unique channel identification ("channel ID") as the key filed of the database structure. The data structure may further includes:
- Frequency(ies)
- Squelch Code, including tones, digital codes and talk group identities
- Geocode/Function/Agency ID (for description and selection)
- Flag for Channel/Best reservation (e.g. professional, wide interest/administrative)
- Network address of channel manager (i.e. channel/best subscriptions)
- Static/Volatile Flag (e.g. fixed, admin. static, dynamic/static, dynamic volatile)

Traditionally, scanning radio receivers were independent receivers where the user directly programs frequencies or talk groups, and applies limited ad-hoc descriptive information in the form of text tags. This haphazard programming methodology is undesirable for the networked systems of the illustrative embodiments. First, the Channel/Best selection system depends on system recognition that the received channel is identical, even for receivers programmed by people who know nothing of each other. Second, consistent descriptive information, such as text tags, should be applied to all transmissions during Channel/Best reception, even if individual users might be inclined to describe the same channel in different ways. Third, for selecting channels to receive, it is beneficial to have globally descriptive information, independent of any point of reception, for each channel. For example, channel description may include geographic location, agency identification, and role of the channel, such as police dispatch or police tactical channel, etc.

Nationwide channel databases have been developed for the purpose of programming scanners, and their use can be incorporated into the teachings of the illustrative embodiment as a key system element. In the illustrative embodiment, each channel is assigned a unique channel ID, which is used as a database key. Radio terminals contributing transmission reports and audio files into the systems of the illustrative embodiment are primarily programmed through the master channel database. End users can still change text tags, but the database key would be preserved, and used as a system wide channel identification code. Users selecting channels for reception, which may employ a directory of channels, would record their selections via channel ID, and descriptions of channels, both in the available directory, and in transmission reports associated with each transmission, would be based on descriptive information from this channel database. Maintaining this channel database is a significant aspect of system maintenance during ongoing operations.

A scanner database is useful to retain certain information for all the radio terminals (i.e. "scanners") that are registered in the systems of the illustrative embodiment. The scanner database uses the a unique scanner identification ("scanner ID" as its key field. The content of the scanner database is simply the cluster identification number to which each scanner is assigned. Each scanner has a manufactured in serial number, which the end user can enter into a web customer account interface to configure his receiver system. The details of the customer account system extends beyond the scope of this disclosure. The scanner consults the online system to determine its intended programming and mode of operation, thus, this scanner database is provided with the scanner ID as a key value, and a cluster ID as an associated data value. Recall that a cluster is a group of one or more co-owned and co-located scanners with identical programming and mode of operation, so cluster data fully defines how the scanner should configure itself for operation within the illustrative embodiment system. Naturally, there is a corresponding cluster database to support this scanner database.

The cluster database has a key filed which is the cluster identification number ("cluster ID"). The cluster ID may structurally be an extension of the customer ID, since such customer may operate one of more clusters of radio terminals. The cluster database comprises the following data fields:
- Customer ID (who operates the cluster)
- Flag for channel/source static storage (e.g. professional use, wide interest, administrative)
- Programming Definition (e.g. list of channels, auto-criteria, such as ZIP code, filters, etc.)
- Programming version ID (e.g. strings: cluster ID and timestamp of latest programming definition)
- List of Users (customer ID) authorized to subscribed to cluster for channel/source and admin. permissions)
- Network Address of each scanner, direct IP address or proxy address as required
- Cluster manager (i.e. LAN address, all scanners in cluster must be LAN addressable)
- Quality Information (e.g. administrative control for blocking or preferring signals from this location for channel/best, stored as a global value and a channel value)

A record in the cluster database defines the intended programming and mode of operation for one or more co-owned and co-located scanners that operate in parallel. From the perspective of a scanner owner, the web interface for setting an entry in the cluster database would be the scanner programming webpage. The full scope of possible programming options is beyond the scope of this disclosure. The customer is encouraged to set programming through selections from the channel database, but ad hoc programming is also permitted.

Several specific fields are added to the scanner programming information. First, the customer can set a list of customers "friend" who are permitted to directly receive channel/source signals. In addition to friends explicitly listed, the scanner/cluster owner himself always has access to channel/source, and this is also true for a special range of administrative user ID's to enable maintenance and customer service. Second, when changes are made that affect scanner programming, the system automatically updates a programming version ID field, and to ensure uniqueness, a string including the cluster ID and the current timestamp. Changes to this field are detected by the scanner and trigger reprogramming when needed to implement programming changes. Third, a mode of operation flag indicates whether channel/source content from this cluster should be implemented as volatile or static. Usually scanners operate in volatile mode, but certain users would have the option of electing static mode, for providing longer data retention and greater reliability. In addition, there is an option of administratively setting a site into static mode if the site is identified as a key high-quality feed site. Note that user and administrative static mode are represented with different database values, so that a payment/service verification system can authenticate access to surcharge services.

Finally, the cluster database includes some fields describing the current network configuration of the member radio terminals. Each radio terminal may be remotely accessed at a unique internet address (IP address and port, and if via a proxy, possibly with a scanner ID parameter passed in GET/POST data or other socket data field). The information necessary to remotely contact the radio terminal is stored here, to support remote control of the scanner. A terminal can contact the database to determine what radio terminals are members of a cluster, and how to contact them. Also, one of the radio terminals is designated as the master for Multi-Sync coordination.

The illustrative embodiment also employs a distribution database. This database used the channel DI as the key field. It comprises a list if client terminals currently 142 near real-time content delivery on the corresponding channel ID, which may be identified by proxy address. When a new transmission report is generated, the system must know where to send the information. Since the channel ID is known, and software must determine where to send the transmission report, this is implemented as a database where the channel ID is the key value, and a list of subscribed client terminals is the data value. Messages to each client terminal are dispatched by sending the transmission report to a proxy (note, clients may reside behind a firewall and not be directly addressable), and this proxy address is stored in the distribution database data field. The proxy address may be paired with a client terminal ID, so in the message forwarding process, it can be verified that the intended recipient is still a target of that proxy address. Some client terminals may be directly addressable via Internet (i.e. not behind a firewall), and if a client terminal is configured to receive messages at an open port, a direct address may be applied instead of a proxy. Note that bundles are defined by administratively placing a bundle ID in the distribution database list for a channel. The form of a bundle ID is analogous to a channel ID, not a proxy address, as would customarily be found in that field.

The illustrative embodiment also incorporates a subscription database, which uses the customer ID as a key field. The subscription database includes a list of channel ID's currently requested by each client terminal ID, and a current address for delivery of transmission reports to the corresponding customer ID, which may be either a direct IP address or a proxy address. This is a mirror-image of the distribution database, co-written to maintain consistency, with the specific function of providing a list of channel subscriptions to remove when a user disconnects from the network.

The illustrative embodiment also employs a relational transmission database, which accumulates transmission reports for each transmission in the system. This database is used for go-back historical queries, as an alternative to near real-time notification. This is the most flexible way to request selected content, but is relatively server-intensive, so streamlined alternatives are provided for ordinary notification of new transmissions as they are initially reported. Note that the database may support "JOIN" operations with the channel database, to allow more complex queries and report more complete information.

The illustrative embodiment also includes a customer database, which uses a the customer ID as a key field. This database includes various fields related to customer permissions, account status, access credentials, and account and billing information. A customer database is necessary to fulfill various functions related to billing and service level verification. This is beyond the scope of the present disclosure. As a general concept, when the authentication system verifies a client, it can generate a random string that will be used as a token to verify authenticity to other system elements. The username/token pair can be written to the customer database, or a supplementary token database, in a mode that prohibits read or write access from non-system elements. Then the client may provide a key/token pair to a server, which can consult this database to see that it is valid.

In addition to the foregoing database structures, the illustrative embodiments also features several system level architectural elements. Among these are the radio terminals and their hardware structure, which are also referred to herein as scanners. The scanner hardware includes the conventional radio scanner circuitry, and also several other processing, memory, and network connectivity elements. When a scanner is responsive to a network command, it is preferred that the command and response be implemented in HTTP format. HTTP is a widely used standard, and provides the best compatibility with network libraries in various client devices. In addition to the network commands listed below, the scanner should recognize an HTTP command that returns an audio stream in a conventional format, which effectively operates as an Internet radio station to a single user, or very small numbers of users, to support a remote-head type application. In addition, existing commands, which can be implemented via serial interface, are also available through an HTTP wrapper (e.g. where the command is sent in GET or POST fields).

When interpreting channel activity for channel/best monitoring, a precise time reference, consistent across unrelated scanners in a region, for start and end of transmission is critical. A misaligned clock would make it difficult to tell which sets of recordings from different scanners correspond to the same transmission. Especially since individual scanners are generally not devoted to a single channel, and may miss transmissions or arrive after the true start time of a given discrete transmission. Therefore, the scanner may use an implementation of NTP (Network Time Protocol) to lock internal clocks to a master reference. To simplify logic around time zone boundaries, scanners receiving the same signal may be located in different time zones, transmission timestamps may be locked to a single standard time zone, such as GMT/UT.

Note, as discussed hereinbefore, that a scanner is associated in a scanner database to a cluster, which has been configured in a cluster database for an authorized customer in a customer database. To use the scanner as part of the networked system of the illustrative embodiment, it must be registered to a particular owner using a customer ID, and also assigned to a cluster. This defines the scanner's programming, and sets permissions for participation in the network.

During operation in the systems, the scanner is presumed to know its own LAN address, which may change from time to time, for example where DHCP (Dynamic Host Configuration Protocol) addressing is employed within the LAN. The address is known through its networking module. A factor that must be considered is that the LAN address may change during operation. When this happens, certain actions need to be taken to update other records of its LAN address, for example, updates to the cluster database, and, if it is the cluster manager, updates to peer scanners within the LAN that the manager address has changed.

The scanner login procedure is an aspect of this architectural element. When a scanner is turned on, or when it is connected to the Internet, it performs a series of steps to establish participation in the network. First, the scanner ensures that the scanner programming is correct using a function call to separate process, which is discussed below. As part of this process, the scanner determines its cluster membership, and caches the corresponding record from the cluster database. Second, the scanner checks to see if the scanner designated as cluster manager is online at the expected LAN address. The expected address is read from the cluster database, and is cached from the previous step. If not present, this scanner asserts itself as cluster manager, to ensure that the cluster has an active manager. Third, the scanner opens a SSH tunnel to a remote proxy server. This is a socket that is left open permanently, and transports bi-directional encrypted data through any local firewall. In practice, it may be used only for incoming data, on the presumption that the scanner has normal outbound network access, but some firewalls block certain ports or destinations, so the option of using the tunnel as a fallback for outward connectivity should be an option. The primary function of the SSH tunnel is to place the scanner on the Internet as a server, for receiving remote administrative commands, or for delivering volatile audio files stored on the scanner. Fourth, a command is sent to the cluster manager that effectively says that this scanner is not currently receiving any signal. If the scanner was turned off and back on during reception, this can clear a record indicating that the channel is being received, allowing other scanners to acquire the signal that was cut off.

Scanner programming is an element of the system architecture. The process of scanner programming may be executed as a function call from the login process, discussed above, or triggered remotely, for example, when there is a change to the cluster database record, if the scanner is added to the cluster, or if the intended programming of the cluster is changed. The scanner consults the scanner database to determine its cluster membership, based on its serial number, and the cluster database to determine its intended programming. If the database's reported programming version code is unchanged, no further action is necessary. However, if the code is different, the scanner reads the programming instructions from this data field, and replaces its current programming with the product of the specified instructions. This may be a combination of auto-programming elements, for example, a lookup for all fire departments within 10 miles of a zip code, or channel database references, for example, channel 17935 from the master channel database, and ad hoc selections, for example 154.250 MHz with a specified text tag. Scanner programming is also discussed at some length in the related patents and patent applications discussed in the Background section, above.

Quality information is read from the cluster database, indicating a global administratively set quality estimate, and a per-channel override. These functions let the system block channels or scanners providing content of consistently poor quality, or misleading the channel manager into poor channel/best management. Conversely, these scores may also be used to prioritize content from selected sites known to have reliably good quality. This data is incorporated into the scanner programming, on a per-channel basis plus a global value, and incorporated into the transmission reports generated to describe each transmission, along with empirical quality metrics gathered by the scanner itself, such as signal strength.

Another field present in the scanner programming is a "shareable" flag, which determines whether content received on the channel may be used for channel/best distribution. This is provided for professional customers who do not want to facilitate other system users in monitoring content from their scanners. This is defined on a per-channel basis, so it is technically possible to lockout and exclude specific content. However, generally, content is shareable by default in the illustrative embodiments.

The sequence of steps in scanner programming in the illustrative embodiment is as follows:
Receive programming command, which may originate from login or session activation, or a remote command upon a change in the cluster database.
Read scanner database to determine cluster ID.
Read cluster database for programming version code.
Compare programming version code.
If different, reprogram radio terminal in accordance with new instructions from cluster database programming definition.

Another architectural element of scanner operation has to do with scanner cluster management. The scanner checks to see if the scanner designated as cluster manager is online at the expected LAN address. Note that when executed at login, the cluster record has just been cached, and no query is necessary. If not present, this scanner asserts itself as cluster manager, to ensure that the cluster has an active manager. The sequence of events is as follows:
Upon a cluster manger command, which verifies or establishes connectivity to a cluster manager;
Read cluster database for cluster manager LAN address.
If address returned, send cluster/ping command via network to verify connectivity.
If unconfirmed due to no LAN address in cluster database, no response to cluster/ping, or negative response, write LAN address to cluster database as cluster manager.

The scanner cluster/ping is a basic ping/health option that shows a scanner is present at the target address, and whether that scanner is acting as a cluster manager. Since responsiveness can be demonstrated with any command, and the true/false indication of manager status is a short field, this may be integrated into an existing command that offers a health/status report for the scanner. The cluster/ping process is as follows:
Cluster/ping command provides external confirmation of cluster manager status.
Compare scanner's LAN address to known cluster manager.
Return true/false for match, indicates whether scanner has determined whether it is the cluster manager or not.

With respect to clusters of radio terminals, the aforementioned Multi-Sync configuration is a functional block in the architecture of the illustrative embodiments. Multi-Sync is a method for scanners within a cluster to ensure that a transmission is captured by only one scanner, leaving the others free to detect new transmissions on other channels. This requires peer-to-peer communication among the scanners, so they may co-ordinate their real-time operations. One scanner, designated the cluster manager, maintains a list of current channel reception for all member scanners. When the cluster manager's table of current reception is updated, when a scanner reports start or end of reception, it distributes the updated list to the other scanners, so they are each aware of what channels are being currently received elsewhere. This knowledge lets each scanner skip transmissions currently being received elsewhere within the cluster, or more efficiently, not test for the presence of signal on these channels by temporarily bypassing it in scan list. Note that the Multi-Sync database should be identical on all scanners, and the cluster manager has the master copy.

When a scanner detects a new transmission, it sends a Multi-Sync SOT command to the cluster manager, to register that the transmission is being received. As a side-effect, this also verifies that the signal is not being received by another scanner, and the cluster manager can issue a wave-off command in that situation. The other member scanners are provided this information as well. When a scanner exits the "hold" state after end of transmission, and will no longer be monitoring a channel, it sends the Multi-Sync EOH (end of Hold) command to the cluster manager. This keeps the other scanners updated with changes to the list of currently received channels. There is a regular periodic action undertaken by the cluster manager, as part of its basic software operation. Scanners are occasionally queried to determine whether it is still active and receiving the signal, thereby verifying accuracy of the Multi-Sync database. This sweep is primarily to maintain database integrity after another scanner has been turned off or removed from the network, and does not need to be performed frequently.

The scanner reception process in the Multi-Sync system is designed to reduce the frequency of Multi-Sync queries to the cluster manager. Each scanner maintains a simplified Multi-Sync database listing channels already known to be received by other scanners, together with a timeout based on the hold period since the information was acquired. This is a short list. The function is that the scanner can skip these channels when a known lease is still in effect, allowing for a faster scan and less network loads, and fewer Multi-Sync queries to the cluster manager.

When a signal is detected, the scanner rejects the transmission if the local Multi-Sync database shows that the channel is being received elsewhere. This test may also be performed before the scanner is tuned, thereby inhibiting signal detection. Audio is recorded to file for the duration of the transmission, and a Multi-Sync/SOT message is sent to the cluster manager. If the response indicates that another scanner has been assigned this channel, possible if two receivers catch SOT at nearly the same instant, the audio recording is aborted, and the scanner resumes normal scanning, which effectively implements a skip command. Otherwise, the scanner continues receiving and recording the transmission.

At end of transmission, the audio recording is terminated and written to a local file, and the scanner begins a hold time timer, which is an interval holding on the channel to receive replies, before being released for normal scanning. As part of the scanner programming, it is presumed that the scanner knows whether channel/source is designated as static or volatile. Once the file has been stored locally, if channel/source is static, the file is uploaded to cloud storage and a transmission report is sent to an external cascade server responsible for notifying interested client terminals. Channel/source is usually volatile, unless there is special interest in a particular feed source's capture of a channel, so it is presumed that there will be little load impact on cloud services to route all channel/source static transmission notifications through the cloud in this way, and it is necessary for applications such as media portals using exclusively their own audio capture on a public website. The metadata packet is sent to the cluster manager, so the list of locally available transmissions is kept current.

Once this is done, the transmission report is sent to the channel manager for evaluation in the channel/best" mode of distribution. Note that if the channel/source storage is static, channel/best should be made aware of this fact using the transmission report so that it can provide a URL that maps to the cloud storage location. There is no need for the channel manager to request upload of this file. Care must be taken, however, if the file retention period for channel/source is less than the file retention period for channel/best.) The file space available on the scanner for preserving audio files is presumed to be limited. A certain amount of free space should be kept available, for use in recording the next transmission. If the free space is too small, the oldest files are deleted until the desired threshold is achieved.

When it is determined that an audio file should be stored to the cloud for distribution beyond the limited web server capacity of the scanner, or retention beyond the scanner's limited internal file memory, or reliability even if the scanner is disconnected from the network, the scanner is given a command to upload the audio file to the Amazon S3 file storage system. Once the file has been saved, and is therefore available for client terminal download, a transmission report describing the transmission is sent to the cascade server, which is responsible for notifying subscribed client terminals to the new audio content. The transmission report in this transaction includes the channel ID and the URL of the audio file at its cloud storage location, or information sufficient to generate the URL according to predefined rules. So the cascade server can notify appropriate clients, the transmission report should specify whether this storage is for channel/best or channel/source. The file may be stored for the benefit of either or both classifications, and the context is known by the triggering function, upload for best is requested by the channel manager, while upload for source is triggered by the scanner's own recording process. A parameter to the upload command may specify whether this is for best or source, and offer a third option for a blind upload, with no cascade trigger, for administrative use in preserving selected transmissions of interest that are initially stored as volatile.

In the illustrative embodiment, client terminals monitoring channel/source in volatile storage mode need to have a way to obtain notifications about new transmissions. With static storage, notifications are dispatched through the cascade server, but with volatile storage in circumstances supporting a very small number of users, typically only the scanner owner, the scanner itself can provide the necessary interface. To keep this implementation simple, the pull method (no push option with an open socket for immediately reporting transmissions from scanner to client. For near real-time notification, the client can poll the cluster at regular intervals and request a list of transmissions stored since the last polling event, which can be defined a later than timestamp filter in the query. Since the client terminal should be able to obtain the list with a single request, regardless of which scanner recorded a transmission, this can be a list maintained by the cluster manager. Therefore, scanners report changes in their file list, added or deleted files, to the cluster manager. More generally, it is beneficial for each scanner to also maintain a list of transmissions reports stored within that scanner. Such a command is beneficial as an API library function for listing locally stored audio files. Therefore, when a file is added or removed from memory, the file list will be updated in both the local scanner and cluster manager, for receptions by the cluster manager itself, this is a single list.

Another architectural element is the subscription manager that executes a subscription manager script, which adds and removes client terminals from a channel's distribution list. When a client wants to subscribe to a group of channels, meaning to start receiving real-time notifications of new transmissions, this script is called to execute the database functions that will generate the routing path to the client terminal. This must be done after the client terminal's delivery address has been determined, and if through a proxy, after the client proxy is established. This is a HTTP script, given the client terminal ID and network delivery address, and a list of channels to receive. The script updates the distribution database to ensure that the client terminal's address is included in the targets for distribution, and clears away any such references that are no longer needed. Further, a subscription database is updated to list what channels are presently being received by this client terminal, so as to enable the deletion of these distributions when the client disconnects. Note that user who require more complex queries (i.e. selecting channels via database selection fields) can obtain information about new transmissions through queries to the relational transmission database. However, these queries may not provide access to volatile content.

The system architecture implements a client proxy between the cascade server and the client terminals to facilitate the deliver of transmission reports. In theory, server/client communications may be most efficient in a push-type implementation, where an open socket connection is maintained between the server and the client for reporting new transmissions. This avoids the overhead of initiating a socket connection for each communications. In a pull-type method this must be done every time the server is polled. However, pull methods are more widely supported. For instance, in HTML5, using JQuery/AJAX. Also, a pull method is unaffected by the risk of a socket connection being broken, as is likely to happen eventually with a persistent socket in a push context.

Since both push and pull transmission report delivery methods have operational advantages, and a client terminal operating in a particular development environment may have a significant preference, usually due to constraints from the programming language, for long-term generality it is advantageous for the illustrative embodiment implementation to support both methods. This is done by insulating the client delivery method from the server notification method by introducing a layer between transmission report generation and transmission report delivery, where content may be pushed or buffered for a pull operation, without the earlier portions of the system knowing or caring about the choice of delivery method.

The client proxy acts as a receiving node for all communications to client terminals. If a client terminal has a persistent socket connection to the client proxy, then the client proxy immediately pushes the data to that client terminal. Otherwise, the client proxy adds the transmission report to a buffer of pending messages, available for future delivery to the client terminals at the next communications opportunity, whether it be push or pull. When a persistent socket is re-established (push), or a pull request is initiated (non-persistent HTTP/HTTPS request for updates, e.g. AJAX), any pending messages are flushed to the client. There are several ways to build a proxy of this type. What is outlined below is a reasonable approach for the illustrative embodiment, and not necessarily the optimal implementation for all embodiments.

In this embodiment of a client proxy, each client is allocated a block of RAM, sufficient to hold a normal number of transmission reports for the maximum interval when a client terminal might be expected to be out of communications, such as between polling requests via pull method, or passing through a region with no network connectivity via push method. If transmission reports are 200 bytes, and the client terminal receives one per second on average, with a maximum two minute absence before a fresh connection must be established, a buffer space of 25 kb would be sufficient. Then, 1 GB of RAM could support a pending message table for 40,000 users, without requiring disk access to buffer content.

If the client proxy memory space is shared, standard Apache HTTP/HTTPS requests to a script can inject new content into a client terminal's buffer, or fetch content from a client terminal's buffer, using a locking mechanism to ensure only a single thread is performing read/write operations at one time. Persistent streams are managed by a daemon that accepts socket connections, and pushes new content from a client terminal's buffer. Alternatively, if a socket reference is stored in a client terminal's memory space, and used by an Apache thread triggered by the arrival of new content, then the content can be pushed immediately to the client terminal without going through such a daemon.

In the aforementioned client proxy environment, a client terminal address is the address of the proxy server, combined with the client ID, which would be passed to a script. The proxy system does not depend on any locally stored data, besides the buffer space, so multiple proxy servers may be employed without any concerns relating to shared disk space, and each client terminal connection can be randomly or arbitrarily assigned to a particular server.

The illustrative embodiment system architecture also contemplates the use of radio terminal proxies, which are referred to as scanner proxies. The scanner proxy serves to fetch content from a scanner behind a firewall, by establishing a SSH tunnel to the scanner. This effectively places the scanner at an Internet address on the proxy server. Routing to the proxy may be via discrete port numbers, or via a scanner ID field in a query with internal reflection to the appropriate tunnel. The proxy system does not depend on any locally stored data, so multiple proxy servers may be employed without any concerns relating to shared disk space, and each scanner connection can be randomly or arbitrarily assigned to a particular server. The proxy server may optionally buffer audio files, so that subsequent fetches may not place additional loads on the scanner's native web server, although this may be inefficient unless a file has been requested more than one time. If SSL encryption or a full SSH tunnel is overly burdensome, a lighter socket implementation can be utilized.

The system architecture of the illustrative embodiment employs a cascade server script for distributing transmission reports to plural client terminals subscribed to a particular channel, whether it is a channel/source subscription or a channel/best subscription. The cascade server also insulates the channel manager from the tasks of performing the series of step through tasks for delivering a transmission report in a real-time loop. When a new transmission is reported from a radio terminal in channel/best or from a static storage location (note the channel/source typically has one client terminal subscribed), it is desirable to insulate the channel manager from any proactive step to notify all the individual client terminals. If the audience size is very large, any algorithm that steps through a list of users will most likely not instantaneous from a computer's perspective, and the channel manager must be free to receive new transmission reports as they come in. A central database of available transmission reports that the client terminals could poll, so the channel manager would simply inject one database record regardless of the number of users, may be considered. However, this does not take advantage of the efficiency inherent in the fact that transmission report notifications are dispatched in near real-time. A database will primarily consist of historical information which is not particularly relevant to this task, and database throughput with complex queries is not well suited to the frequent polling required for quick delivery of transmission reports. Also, since polling a database depends on client terminal action, it is not as quick as a push method that proactively sends a notification to the client terminal when a transmission event is triggered by the channel manager.

In the illustrative embodiment, the cascade server uses a cascade script, which takes a single transmission report, and generates notification messages for each client terminal that is subscribed to receive that particular channel. In this parlance, cascade refers to the one-to-many conversion. The script does not depend on any locally stored information, rather just the data provided in the transmission report HTTP request, and information from an external database of subscribers to the channel, so any number of servers can be configured to run this script, useful where load balancing may be required, but there is no locally shared data to limit expansion into parallel servers to meet demand. The script receives a transmission report that describes a specific transmission. The only values the script requires is the channel ID, and a flag indicating whether channel audio storage is presently volatile or static. The script is otherwise handling a monolithic block of data to transmit without concern about the contents. The script polls the distribution database to obtain a list of clients subscribed to receive transmissions on this channel. Then the script executes its primary function, which is stepping through each destination address for individual client terminals, and sending the metadata package. Finally, the mode of storage is reviewed. The volatile/static flag has three states, differentiating between administrative and dynamic forms of static storage. When a channel is marked volatile, if the number of subscribed client terminals exceeds a threshold, a message is sent to the channel manager requesting a switch to static storage mode. When a channel is marked static, in the dynamic form, a message is sent to the channel manager reporting the current number of subscribed client terminals, which is useful for logic there to determine if and when the channel will revert back to volatile storage. Both commands to the channel manager take the same form, which is a report of channel ID and number of subscribed clients.

The system architecture of the illustrative embodiment also employs a channel manager for implementing the channel/best monitoring service. The channel manager is a software process that supervises channel/best content, selecting the best copy of each transmission and triggering client terminal notification. The channel manager is not pertinent to channel/source monitoring since the radio terminal (scanner) directly notifies the cascade server script. The channel manager operates as a daemon, responsive to one command. When a new transmission report is received, the information is placed in a local database within the channel manager. All other operations in the channel manager occur on a periodic basis. A single daemon instance can manage a significant number of channels, which may be grouped by region or type. A separate channel manager process is not required for each discrete channel. The daemon network address for each channel would be written into the channel database, so scanners know where to send reports.

To screen out truncated recordings, which are those with premature EOT, the channel manager does not select content for channel/best distribution until it is reasonably certain that all copies of the transmission report have been captured, increasing the likelihood of have a real EOT. Therefore, a latency delay period is imposed that is equivalent to the expected maximum duration of normal discrete radio transmissions. Therefore, the channel manager does not view a transmission report for a candidate for channel/best selection until a period of approximately two minutes has elapsed. This will screen out premature EOT (bad reception) when a full copy of the transmission has not yet been reported, because recording has not been completed. If the latency is undesirable, there are two alternative options. First, the scanner may notify the channel manager of ongoing recordings at periodic intervals, in essence placing a hold on selection of that channel until the recording has completed. This allows for lower latency when there is no ongoing recording of the channel, and hence no possibility of currently available content being eclipsed by a more complete recording. Second, reception with a high signal strength may be presumed immune to premature EOT, and used to trigger content selection even if a shorter time has elapsed. The following algorithm does not incorporate these concepts, but they may evidently be added if desired.

At initialization, the channel manager reads the channel database to determine the storage mode of channel/best for each channel under its supervision. There are three states. Static/administrative is used for channels of special interest, selected for unconditional retention in the cloud. Other channels are dynamically assigned to static storage (cloud) or volatile storage (served from scanner) modes, depending on listenership patterns. The scoring mechanism between plural transmission reports is key to the success of the channel/best selection process. In general, the best recording of a transmission will be the longest, which biases against recordings where the scanner arrived on the channel mid-transmission, and with the highest signal strength. These are effectively independent parameters, and the selection mechanism must weight these factors appropriately, particularly in edge cases, where a weak recording captured the entire transmission but a strong recording clips the start.

If a radio terminal source, scanner or cluster, is administratively marked as poor or prohibited, a recording of a transmission may be marked down, or even entirely rejected from consideration by the channel manager. It may be important to reject transmissions before the partitioning is implemented, for example if a source is simply incorrect in its channel identification so inclusion of these transmission reports would break the partitioning's ability to independently evaluate transmissions. For an automated approach to some such issues, if most sources report two discrete transmissions separated by a gap but one source indicates continuous signal across that gap, it may be reason to disqualify that source and partition without regard for its report.

With regard to channel/best transmission report generation by the radio terminals, the scanner detects possible deficiencies in the recording, such as radio birdies, no audio present, etc., and includes this information in the transmission report so the selection process can bias against such recordings, either before or after partitioning. This evaluation must be done at the scanner, if audio is stored separately and only the transmission report is present at the channel manager.

The system architecture of the illustrative embodiment also contemplates a client terminal authentication process. When logging in, a client terminal authenticates its identity with password verification, or an equivalent process, and is then issued a client proxy, which is the channel for real-time transmission report notifications. To begin this process, the client terminals passes credentials to a network service that consults the customer database to verify authenticity. If verified, this service sends a registration request on behalf of the client terminal to a client proxy, and provides the client terminal with the proxy address. Then the client terminal performs whatever initialization tasks are necessary to configure its media player for a selection of channels of interest. This may involve loading a configuration file that specifies channels. Once channels are identified, the client terminal contacts a subscription management script to create connectivity that routes new transmission reports to the client's proxy. With this established, the client terminal uses its connectivity method of choice, push or pull, to fetch transmission reports. When the client terminal's transmission report database needs to be populated with older content, it consults the relational transmission database. If the client terminal's list of channels of interest includes channel/source channels from a cluster not marked for static storage, the client terminal will also need to poll the cluster manager to obtain reports of new transmissions from that source.

Note that channel/source monitoring, while usually limited to a small number of customers with distribution handled by the cluster manager, can sometimes be placed in an administrative static storage mode. This is primarily intended for high-quality reception sites, providing for lower latency, since no comparison process is required to select transmissions. Particularly, if restrictions in accessing this class of content is desired, user authentication at the subscription management script may be extended to include verifying client access to the requested channels or bundles of channels. More generally, the ability to restrict channels and bundles (e.g. by level of service) may be desired. This extends to customer account management, and determination of levels of service, with technical means for enforcing client limitations.

It is useful to consider additional illustrative embodiments in contemplating other exemplary uses of the claimed inventions. In a first scenario, a professional user captures and monitors audio from a constellation of their own radio terminals. Examples of professional applications include without limitation public safety agencies such as police, fire, or ambulance services; emergency management agencies, to aid in monitoring events within their sphere of responsibility. Also, newspapers or other media organizations, where audio is used for internal journalistic purposes, or for public distribution via an online website or web service making specific audio channels available for public consumption. Also, businesses specializing in disaster response, who need to know of incidents to facilitate a timely response to local events. By operating their own radio terminal equipment, the professional user can be sure of adequate coverage of specific channels of interest, by operating receivers that scan the desired channels, and in a sufficient number and configuration to capture nearly all individual transmissions. Such users also take responsibility for the maintenance and reliability of the radio terminal monitoring stations. While such content may be available from other sources, directly operating the monitoring station can reduce some forms of risk that may be present in using audio sourced from incidental use of the product of someone else's radio receivers.

To receive a group of channels, the professional user operates a cluster of radio terminals with multiple receivers employing Multi Sync to co-ordinate their tuning and thereby improve the probability of capture of any individual transmission. Since any individual channel may be received on any of several scanners, direct monitoring of the audio output of individual receivers is generally not productive in such an environment, and the cluster is dedicated to audio monitoring via network services, where the chain of transmissions on an individual channel are effectively brought together, independently of which receiver captured each transmission. If the channels to receive must be monitored from different geographic receive sites, or require different scanner configurations, the user may operate multiple clusters with separate programming to cover the full set of channels of interest. For this type of professional user, all channels received are marked for static storage for greater performance and reliability. Presuming the capture of channels of interest is both comprehensive and with good signal strength, channel/source monitoring is preferred over channel/best, because of lower latency and greater control over source quality. With no need to integrate content on the same channel from different clusters post-reception, the channel manager may be omitted. Particularly where there are a limited number of listeners anticipated, the distribution process may be implemented directly to the client terminals in place of system elements in the prior illustrative embodiments encompassing subscription, distribution and cascade portions of the system architecture.

In a second exemplary illustrative embodiment, a hobbyist user captures and monitors audio from a single radio terminal. This scanner is not connected to the Internet, and does not partake in communications with remote servers, including cloud storage, but does provide means for a data connection to client software by LAN connectivity, or direct receiver/client communications via a serial data protocol. All the audio is coming from a single radio terminal, so there is no need to switch between receivers to monitor, it is sensible to directly listen to its audio output, either at a speaker or remotely via a network audio stream, as the radio terminal captures transmissions on various channels of interest. During this process, the radio terminal records each transmission to a local audio file. When monitoring in this embodiment, and desiring to retrieve previously recorded content, the client terminal polls the radio terminal for a list of available transmission reports, usually filtered with certain criteria (e.g. metadata channel identification or recording timestamp range.) Then the client terminal pulls selected audio files from the radio terminal's data storage, for playing on the client device.

In a third exemplary illustrative embodiment, a large number of individually operated hobbyist radio scanners (radio terminals) submit received content to a central repository operated by a network service, and other customers of this network service, who do not operate radio frequency equipment, can monitor this recorded content. In this "big ear" crowd sourced model, virtually all transmissions received by a participating radio scanner, from any location, for any reason, is made available to a multitude of users anywhere via the network. By making use of the crowd sourced hobbyist interest, including local knowledge of broadcast channels that may be of interest, this content acquisition model provides a more comprehensive catalog of available channels than would be practical with dedicated professionally operated receive stations.

The radio terminal receivers are operated by individual hobbyists for their own purposes, and the owners of these radios have control over their channel scan lists and times of operation. In particular, since the hobbyist may be listening to the direct audio output, each scanner must be free to receive any transmission on its scan list, irrespective of whether the same transmission on the same channel is being concurrently received by another independently operated scanner feeding recorded content into the same central repository. That is, Multi-Sync should not be employed to force a hobbyist's personal scanner away from a transmission, to facilitate efficiency in capturing content for the repository, since this would deprive the scanner owner of the benefits of immediate reception of that transmission on his receiver.

Radio terminals submit reports of recorded transmissions to a channel manager responsible for that particular broadcast channel. The channel manager selects the best copies of each transmission, based on various criteria such as signal strength, duration of recording, and receiver reputation. Transmission reports describing the transmission, along with a URL for obtaining a copy of the referenced audio file for the copy selected as the best copy, is then distributed to client terminals of users interested in this channel. In many cases, this includes an intermediate step of notifying the scanner that its recording was selected for distribution, so that it may upload the audio to a cloud storage with greater server resources and network bandwidth for supporting client requests. However, for channels with light usage, the audio file may be served directly from the scanner device.

Hobbyist radio terminals receivers may be supplemented with professionally operated receiver clusters, analogous to the description in the first scenario, where transmission reports are provided to the channel manager as described above for this scenario. In this manner, the central repository has access to a broad base of audio content from hobbyist scanners, as well as more reliable content from a smaller number of professional scanners. In many cases, the normal channel manager selection process may designate the professional cluster's recording as the best available copy. Client terminals may be configured to receive channel/best or channel/source. "Best" may be more complete due to the superset of available receive stations, while "source" may be more reliable due to fewer mislabeled transmissions and less volatile storage.

Some variations of the forgoing illustrative embodiments are insightful. For example, a client terminal can collect reports of new transmissions from various places, including a client proxy, which collects transmission reports from other system elements that notify the proxy about transmissions on behalf of the client, direct queries to a database of transmission reports, which acts as a central repository for transmission reports, in a system process which actively collects and distributes reports of transmissions if a channel manager permitted persistent data stream connections directly to clients, or even the scanner radio itself.

The client terminal can obtain reports of new transmissions from a single system element, in which case this upstream or prior node must acquire information about new transmissions on all channels of interest to the client. Alternatively, the client terminal may make parallel connections to multiple system elements, usually in an architecture where different groups of channels are managed separately, which could be from different content suppliers, or from the same content supplier but where the set of all channels has been partitioned into separately managed chunks for administrative convenience or bottleneck avoidance. In this case, it is possible that no single system element before the client terminal is necessarily informed of new transmissions of interest to all channels of interest to the client. For example, reports of individual transmissions may be directed from the scanner radio to one of several packages based on the broadcast channel's geographic origin and/or agency type (e.g. which county the broadcasting agency is within, and whether fire/police/other), or a quality or administrative status of the receiving equipment (e.g. professionally operated or crowd sourced content). In general, when a user is interested in monitoring multiple channels, it is common for the set of channels to be highly related (e.g. all channels may be fire departments within Brevard County Fla.), so a package that selectively acquires transmissions of like type can be an efficient method for routing transmission reports while keeping the bandwidth of internal communications paths relatively light and avoiding data bottlenecks. In this context, if a client has the capacity to directly acquire transmission reports from more than one package through parallel data streams (push) or polling (pull), the need for a client proxy gathering content into a single buffer or pipe for this client is eliminated, even if the user wants to monitor a set of channels that fall into different partitions in the channel management or package system architecture.

When transmission reports come from different sources without passing through a single node that issues unique timestamps to each transmission, for instance, through sequential processing, or if transmissions are reported with different administrative latencies (e.g. intentional delay of tactical channels), the client terminal may be required to internally organize its list of available transmissions without using a timestamp as a unique key, and, in the event of differential latency, would not always sequence transmissions for playback in accordance with the transmission report timestamp.

When playing transmissions as they initially become available for monitoring, where availability is dictated by both technical latency in transmission notification, and administrative latency in enforced minimum delay of at least some channels, transmissions may be played out of sequence relative to their actual broadcast time. A minimum generic delay, greater than the anticipated customary range of technical latency, may be advantageous for preserving transmission order in initial near real-time playback because this lets all transmission reports from a certain time arrive at the client before the client determines the order in which they should be played, thus avoiding the circumstance of technical latency resulting in notification of an earlier transmission arriving only after a later transmission has already been played. However, if a channel has an administrative latency greater than a minimum generic delay, transmissions from the administratively delayed channel may be played, in such a near real-time mode, significantly later than contemporaneous transmissions on other channels.

When playing transmissions recorded at a prior time, far enough in the past that all transmissions have been released from this administrative latency, it is advantageous to play transmissions in the sequence of their actual broadcast time. This is the most natural way to understand sequencing in this context. However, if the user has gone back from near real-time monitoring, switching the selection mode in this manner may be confusing, since transmissions in replay may be presented in a different order from the original presentation. Therefore, it is advantageous to dynamically switch between sequence selection rules, or allow user control, to preserve the intuitively expected mode of operation as the client's time of selection is dynamically adjusted in use.

To help preserve sequencing of transmissions on an individual channel, against the influence of differential technical latency between transmissions, for example, due to different upload times for audio files of different lengths, it is advantageous to upload transmissions, and/or release metadata describing the transmissions, on the same channel in a serial manner, in order of their broadcast sequence. This avoids the circumstance of a short transmission response immediately following a long transmission dispatch, where, if uploaded and released to clients in parallel, the lower latency for the short transmission may result in it being available for playback before the prior long transmission has completed the technical process required for availability to clients.

In another aspect of the illustrative embodiment, the client terminal software maintains an internal database of transmission reports. In normal operations, the client terminal is notified of new transmission reports on selected channels of interest, and this information is cached in the client terminal. In addition, the client terminal may query the relational database to fill in periods for which cached channel reports are not available, for example, for periods prior to the time when the client session was initiated, or for periods before a change to the list of channels of interest. The client terminal's cache can be purged of older elements to stay within size limitations, but generally provides a complete record of all transmissions on the selected channels of interest over a known period of time. This does not limit the client terminal's ability to access information from other times, since the cache may be augmented with additional information available via a database query to the server-maintained archives.

When initiating a session, to enable automated notifications of new transmissions, the client terminal must specify the list of channels of interest so that the system knows what transmission reports should be, when they become available, passed to this client. In general, it is presumed that the selection of channels may be of interest to the same user over multiple sessions, or to other users with similar interests. Therefore, it is preferred that channel selection lists be stored as persistent data, probably in cloud or server-side storage. Such lists may also be stored on the client device, but this restricts their availability to a single device. Channel selection lists may be stored in the customer database, associated with a customer who has authorship rights over changes to the document. Alternatively, these lists may be stored in files associated with particular customers, or in a channel selection list database.

Note that the function of a channel selection list is to define which particular channels a client should subscribe to, or in a more fundamental description, to define for which particular channels the system should notify the client upon the detection of new transmissions, via transmission reports. This set of channels is not necessarily identical to, and is often wider than, the channels which the user has activated for reception. This is so the client can be easily responsive to changes in the user's selection of channels for reception, without needing to refresh the cache to maintain a comprehensive list of transmissions over a time interval. To minimize cache incompleteness and database queries, the list of channels of interest, for which transmission reports are received, should be fairly stable during a client session, even though the user may frequently select or deselect channels for active reception during the session. In essence, the list of channels of interest defines a universe from which the client may easily engage or disengage from particular channels.

A customer may have a particular configuration, which is a list of channels of interest, stored as part of his account record, as a home page that the media player uses when first connected. Alternatively, a home page may provide a list of available configurations, without any specific channels of interest to subscribe to at that stage. Whereas the action of changing the list of channels of interest may involve fetching a new configuration file or database record, the action of selecting or deselecting particular channels usually involves local effects only within the client device.

There are a wide range of options for how channels of interest are defined. In the simplest case, this may be nothing more than an explicit list of channels. Alternatively, channels may be defined by a set of common properties (e.g. all fire department channels in Brevard County Fla.) so all matching channels are subscribed to without more detailed user specificity. Or channels may be administratively grouped into bundles that are subscribed to as a single unit, and for which the description is sufficiently sensible that the bundle's contents are comprehensible to the user. Rules for channels of interest may include logical relations (and, or, not, etc) to define or modify sets. For active monitoring, without adjustment to the list of channels of interest, the client may offer selection menus to enable/disable particular channels from that list, or similar actions on predefined groups of channels, which are options available to adjust the collections of such predefined groups. These menus may also offer options for loading one or more alternative configurations, list of channels of interest, or specifying such a configuration by identity or address.

Some lists of channels of interest may be extremely simple, such as a single channel. In this case, the identity or address for the configuration may be the channel identification itself, with the content implicit, with no need for traditional storage. Some lists of channels of interest are automatically generated, such as the 14 most active broadcast channels within a geographic region, or channels trending active, where the ratio of current to normal loads is particularly high. If the client is equipped with location means, such as a GPS receiver, the client may request automatically generated lists of channels based on the client's immediate location. In this instance, the list of channels of interest may change frequently as the client moves.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of selecting a preferred audio recording of a discrete radio transmission, comprising the steps of:
   receiving, by plural radio terminals, a discrete transmission of audio content from a radio channel having a channel identity;
   recording, and storing at a network address, an audio file of the discrete transmission, correspondingly, by each of the plural radio terminals;
   sending a transmission report that includes the channel identity, a transmission time, and the network address, correspondingly, from each of the plural radio terminals to a channel manager;
   selecting, by the channel manager, a preferred audio file of the discrete radio transmission by comparing the contents of transmission reports sent from the plural radio terminals, and
   communicating the network address of the preferred audio file to a network destination.

2. The method of claim 1, and wherein:
   at least a portion of the plural radio terminals comprise a land mobile radio scanning receiver, and
   the radio channel is land mobile radio channel.

3. The method of claim 2, and wherein:
   the radio channel is a logical channel that is partially specified a talk group code.

4. The method of claim 1, and wherein:
   at least a portion of the radio terminals includes a memory, and wherein
   said storing step includes storing the corresponding audio file in the memory.

5. The method of claim 4, and wherein the network is the Internet and the at least a portion of the radio terminals includes an Internet web server, and wherein:
   said storing step further includes specifying an Internet uniform resource locator as the network address, and wherein
   the Internet web server is responsive to a transmission control protocol of the Internet protocol suite request that contains the Internet uniform resource locator, to serve the audio file contents stored in the corresponding memory location.

6. The method of claim 1, and wherein said discrete transmission of audio content is a single discrete transmission amongst an intermittent series of discrete transmissions of audio content, and further comprising the step of:
   isolating the single discrete transmission of audio content using a squelch circuit in a first radio terminal.

7. The method of claim 6, and wherein:
   an initial detection of the single discrete transmission of audio content by the squelch circuit defines the transmission time, which is correspondingly included in the transmission report.

8. The method of claim 7, and wherein:
   the transmission time further includes a duration of the single discrete transmission of audio content, and wherein said selecting step is accomplished by comparing the transmission time and duration of transmission portions of the transmission reports.

9. The method of claim 1, further comprising the step of:
determining a quality factor of the audio file by at least a first radio receiver;
incorporating the quality factor into at least a first transmission report, and wherein
said selecting step is accomplished by comparing the quality factor.

10. The method of claim 9, and wherein:
the quality factor includes at least one of; signal strength, radio birdie detection, and inadequate audio level factors.

11. The method of claim 1, further comprising the steps of:
upon selecting a preferred audio file, sending an upload command, including the channel identity and transmission time, to a first radio terminal, which generated the preferred audio file;
in response to receipt of the upload command by the first radio terminal, uploading the preferred audio file to a predetermined address in a network cloud storage server, and
sending a subsequent transmission report to a cascade server, which includes the subsequent network address of the preferred audio content, thereby enabling the cascade server to notify requesting network terminals of the predetermined address in the network cloud storage server of the preferred audio content.

12. A system of selecting a preferred audio recording of a discrete radio transmission, comprising:
plural radio terminals, each configured to receive a discrete transmission of audio content from a radio channel having a channel identity, and wherein
each of said plural radio terminals correspondingly records and stores an audio file of said discrete transmission of audio content at a network address, and wherein
each of said plural radio terminals correspondingly sends a transmission report that includes said channel identity, a transmission time, and said corresponding network address, to a channel manager, and wherein
said channel manager selects a preferred audio file of said discrete radio transmission by comparison of said transmission reports contents received from said plural radio terminals, and wherein
said channel manager communicates a network address corresponding to a preferred audio file to a network destination.

13. The system of claim 12, and wherein:
at least a portion of said plural radio terminals comprise a land mobile radio scanning receiver, and wherein
said radio channel is land mobile radio channel.

14. The system of claim 13, and wherein:
said radio channel is a logical channel that is partially specified a talk group code.

15. The system of claim 12, and wherein:
at least a portion of said radio terminals includes a memory, and wherein
said portion of said radio terminals store said corresponding audio file in said corresponding memory.

16. The system of claim 15, and wherein said network addresses are on the Internet, and said at least a portion of said radio terminals include an Internet web server, and wherein:
said at least a portion of said radio terminals specify and Internet uniform resource locator as said network address, and wherein
said corresponding Internet web servers are responsive to a transmission control protocol of the Internet protocol suite requests that contain said Internet uniform resource locator, to serve the audio file contents stored in said corresponding memory locations.

17. The system of claim 12, and wherein said discrete transmission of audio content is a single discrete transmission amongst an intermittent series of discrete transmissions of audio content, and wherein:
at least a first one of said plural radio terminals isolate said single discrete transmission of audio content with a squelch circuit.

18. The system of claim 17, and wherein:
an initial detection of the single discrete transmission of audio content by the squelch circuit defines the transmission time, which is correspondingly included in the transmission report.

19. The system of claim 18, and wherein:
said transmission time further includes a duration of said single discrete transmission of audio content, and wherein
said channel managers selects said preferred audio file by comparison of said transmission time and said duration of transmission portions of said transmission reports.

20. The system of claim 12, and wherein:
at least a first one of said plural radio receivers determines a quality factor of said corresponding file, and wherein
said at least a first one of said plural radio receivers incorporates said quality factor into at least a first transmission report, and wherein
said channel manager selects said preferred audio file by comparison of said quality factor.

21. The system of claim 20, and wherein:
said quality factor includes at least one of; signal strength, radio birdie detection, and inadequate audio level factors.

* * * * *